US00RE42508E

(19) United States
(12) Reissued Patent
Lewis et al.

(10) Patent Number: US RE42,508 E
(45) Date of Reissued Patent: Jun. 28, 2011

(54) METHODS AND SYSTEMS FOR HEALTHCARE PRACTICE MANAGEMENT

(75) Inventors: Charles Lewis, Lake Mary, FL (US); Terrance Moore, Oviedo, FL (US)

(73) Assignee: Jasos Intellectual Property LLC, Lake Mary, FL (US)

(21) Appl. No.: 12/832,813

(22) Filed: Jul. 8, 2010

Related U.S. Patent Documents

Reissue of:
(64) Patent No.: 7,398,217
Issued: Jul. 8, 2008
Appl. No.: 09/812,704
Filed: Mar. 19, 2001

(51) Int. Cl.
*G06Q 10/00* (2006.01)
*G06Q 50/00* (2006.01)
*G06Q 40/00* (2006.01)
*G06F 11/34* (2006.01)
*H04M 3/51* (2006.01)

(52) U.S. Cl. ..... 705/2; 750/4; 750/11
(58) Field of Classification Search ..... 705/2–4, 705/11
See application file for complete search history.

(56) References Cited

U.S. PATENT DOCUMENTS 5,365,425 A 11/1994 Torma
5,535,118 A 7/1996 Chumbley
5,557,514 A 9/1996 Seare
5,706,441 A 1/1998 Lockwood
5,722,416 A 3/1998 Swanson
5,724,379 A 3/1998 Perkins
5,737,539 A 4/1998 Edelson et al.
5,784,635 A 7/1998 McCallum
5,835,897 A 11/1998 Dang
5,918,208 A 6/1999 Javitt
5,924,073 A 7/1999 Tyuluman
5,953,704 A 9/1999 McIlroy
6,000,828 A 12/1999 Leet
6,012,035 A 1/2000 Freeman
6,014,631 A 1/2000 Teagarden
6,026,364 A 2/2000 Whitworth
6,029,138 A 2/2000 Khoransani
6,055,511 A 4/2000 Luebbering et al.
6,081,809 A 6/2000 Kumagai
6,112,182 A 8/2000 Akers
6,112,183 A 8/2000 Swanson et al.
6,151,581 A 11/2000 Kraftson
6,195,612 B1 2/2001 Pack-Harris
6,223,164 B1 4/2001 Seare
6,370,511 B1 4/2002 Dang
6,381,576 B1 4/2002 Gilbert
6,385,589 B1 5/2002 Trusheim
7,379,885 B1 5/2008 Zakim
7,389,245 B1 6/2008 Ashford et al.
7,401,027 B2 7/2008 Moore
2001/0037216 A1 11/2001 Oscar
2001/0041990 A1 11/2001 Javitt (Continued)

OTHER PUBLICATIONS

Higgin, M., Securing the perimeter; Health Management Technology; Atlanta; Dec. 2000; vol. 21; Issue 12, pp. 8-12.

(Continued)

*Primary Examiner* — Luke Gilligan
(74) *Attorney, Agent, or Firm* — Bracewell & Giuliani LLP

(57) ABSTRACT

Methods and systems are provided for optimizing profits for healthcare practices and insurance networks. The methods and systems include modifying physician's cost management behavior to enhance profitability of healthcare practices and insurance networks by identifying physicians that are not profitable because of cost management behavior and providing intervention to change the management behavior of the physician.

62 Claims, 7 Drawing Sheets

U.S. PATENT DOCUMENTS

| | | | |
|---|---|---|---|
| 2002/0111826 | A1 | 8/2002 | Potter |
| 2002/0120468 | A1 | 8/2002 | Atallah |
| 2002/0138303 | A1 | 9/2002 | Enos |
| 2002/0152097 | A1 | 10/2002 | Javors |
| 2008/0059248 | A1 | 3/2008 | Lewis |
| 2008/0097790 | A1 | 4/2008 | Moore |

OTHER PUBLICATIONS

Landon, "A Conceptual Mode of the Effects of Health Care Organizations on the Quality of Medical Care," May 1998, JAMA, vol. 270, No. 17, pp. 1377-1382.

Rice, Physicians Payment Policies, 1997 Annual Review Public Health, pp. 549-565.

Glass, "Incentive-Based Physician Compensation Model," Jul. 1999, Journal of Ambulatory Care Management, pp. 36-40.

Segal, Influencing Physicians Prescribing, Oct. 1999, Pharmacy Practice Management Quarterly, pp. 30-50.

Cherney, Choosing as Advantageous Risk-Sharing Arrangement, Mar. 1999, Healthcare Financial Management, pp. 35-37.

Rosenstein, "Changing Physicians Behavior is Tool to Reduce Health Care Cost," Sep. 1991, Healthcare Strategic Management, vol. 9, Issue 9, pp. 14-16.

Snail, The Effects of Hospital Contracting for Physicians Services on Hospital Performance, Spring 2000, Univ. of California, Berkley, pp. 1-182.

Young, "Aligning Physican Financial Incentives in a Mixed-Payment Environment," Oct. 2000, Healthcare Financial Management, pp. 46-55.

Davis, "New Compensation Model Improves Physician Productivity," Jul. 1999, Healthcare Financial Management, pp. 46-49.

Shulkin, "Promoting Cost Effective Physician Behavior," Jul. 1993, Healthcare Financial Management, vol. 47, No. 7, pp. 48-54.

Schwartz, Creating a Benchmark Database, Jan. 1998, Health Management Technology, pp. 65-66.

Office Action in co-pending U.S. Appl. No. 11/933,075 dated Dec. 21, 2010.

Office Action in co-pending U.S. Appl. No. 12/683,252 dated Dec. 15, 2010.

"Celadon Health Signs With Symmetry; Physician Incentive System Will Use Episode Treatment Groups (TM)", www.prnewswire.com, Phoenix, AZ.

Boyden, Andrew, Dr., et al., "The Appropriate Use of Financial Incentives to Encourage Preventive Care in General Practice", Centre for Health Program Evaluation, May 2000, Research Report 18, Australia.

Information Disclosure Declaration of Charles C. Lewis and Terrance Moore.

Securing the perimeter; Health Management Technology; Atlanta; Dec. 2000; Mark Higging; vol. 21; Issue 12; Start pp. 8-12.

Rosenstein, et al., Changing Physician Behavior is Tool to Reduce Health Care Costs, Health Care Strategic Management, Chicago, Sep. 1991, vol. 9, Issue 9, p. 14.

File history of U.S. Appl. No. 09/812,703 which has been allowed.

48
Current prescription
New prescription
Advantages
48
27
40
PHARMACY
INSURANCE CLAIMS DATABASE
COMMUNICATION NETWORK
FEEDBACK TO PHYSICIAN'S OFFICES
100
PHARMACY BENEFITS MANAGER
20

108
PATIENT CHART, INSERT

METHODS AND SYSTEMS FOR HEALTHCARE PRACTICE MANAGEMENT

Matter enclosed in heavy brackets [ ] appears in the original patent but forms no part of this reissue specification; matter printed in italics indicates the additions made by reissue.

RELATED APPLICATIONS

The application is related to U.S. patent application Ser. No. 09/812,703, U.S. Pat. No. 7,401,027, titled "Methods For Collecting Fees For Healthcare Management Group" filed on the same date herewith by the same inventors, which is incorporated herein by reference in its entirety.

FIELD OF THE INVENTION

The present invention relates to the healthcare industry and, more particularly, to the field of healthcare management.

BACKGROUND OF THE INVENTION

In the healthcare industry, as illustrated in FIG. 1, physicians generally organize themselves into practice groups 25 and normally subcontract to an insurance network 30. The insurance network 30 is not limited to traditional insurance networks, i.e., Blue Cross Blue Shield, Aetna, United Healthcare, etc., but also includes self insured networks within companies, employers, or other large entities. The insurance network 30 includes a plurality of patients 35 that obtain healthcare services from the plurality of physicians 25 participating in the insurance network 30. The groups of physicians 25 include a plurality of physicians 25 that provide healthcare services to a plurality of patients 35 within a particular geographical area in varying medical fields. The physicians in the healthcare practices 25 are normally compensated a predetermined reimbursement amount by the insurance network 30 for every subscribing patient 35 in the insurance network 30 that is to be treated by the physicians 25.

For example, a physician 25 participating in the insurance network 30 may be reimbursed $80 per month by the insurance network 30 for agreeing to treat a patient 35 in the insurance network 30 and assuming the responsibility for a percentage of the ancillary medical costs for that patient 25. As illustrated in FIG. 1, there exists a relationship between the insurance network 30 and the physician practice 25. Likewise, there also exists a relationship between the patients 35 and the insurance network 30, and the patients 35 and the physician practices 25. The physician practice 25 normally receives payment for services directly from the patients 35 or though reimbursements from the insurance network 30. The payment that is received from the patient 35 can be in the form of a co-payment or a partial payment for the healthcare services. In order for the physician practice 25 participating in the insurance network 30 to receive the entire reimbursement amount from the insurance network 30, i.e., the $80 per month for agreeing to treat each patient 35, the physician practice 25 must comply with preselected requirements set by the insurance network 30. These requirements often fall within varying cost centers, such as pharmaceutical, laboratory, anesthesiology, and radiation costs, for example.

In the pharmaceutical area, for example, a wide variety of prescription medications are developed and manufactured to combat similar illnesses. As illustrated in FIG. 1, prescription medication manufacturers 24 sometimes enter into agreements with the insurance network 30. The prescription medication manufacturers 24 sometimes offer rebates to insurance networks 30 if the physician practice 25 prescribes their medications. The prescription medication manufacturers 24 cannot enter into these types of agreements with the physician practices 25, as it would likely be contrary to public policy. The insurance network 30, in turn may enter into an agreement with a pharmacy network 21, such as a pharmacy benefits management (PBM), for example, to encourage the physician practice 25 in the insurance network 30 to prescribe certain medications. The PBM is compensated a profit on the preferred prescription medications, and a portion of the profits are then passed along to the pharmacy 40. The requirements, or preferences, set by the insurance network 30 regarding pharmaceutical costs, for example, include the types of prescription medications that the physicians may prescribe to their patients.

In some instances, the insurance networks provide incentives to the physician practice 25 for prescribing medications upon which, the insurance network 30 receives discounts from prescription medication manufacturers 24. If the physician practice 25 bears any percentage of medication costs for the patient 35 and prescribes medications which differ from those preferred by the insurance network 30, the incentives may be withheld from the physician practice 25, i.e., the physician practice 25 may be paid nothing instead of $10 for the patient 35 in the insurance network 30. As illustrated in FIG. 1, the insurance network 30 monitors the prescriptions that the physician practice 25 participating in the insurance network 30 writes through a monitoring relationship developed with pharmacies 40 and pharmacy networks 21. In this monitoring relationship, the pharmacy 40 and the PBM provide claims data to the insurance network 30.

There are many different levels of risk for the physician practice 25 that is associated with this arrangement. If the insurance network 30 assumes the financial responsibility for the patient's 35 healthcare needs, then the physician practice 25 assumes no risk. If, however, the physician practice 25 assumes the financial responsibility for the patient's healthcare needs, i.e., any healthcare costs beyond the reimbursement amount from the insurance network 30, then the physician practice 25 assumes the most risk. Another alternative arrangement is if the financial responsibility for the patient's 35 healthcare needs are shared between the physician practice 25 and the insurance network 30. In such an arrangement, the risk for patient's 35 healthcare costs is shared between the insurance network 30 and the physician practice 25. As illustrated in FIG. 1, the payments between the insurance network 30 and the physician practice 25 can vary depending upon the amount of risk taken by the physician practice 25.

As further illustrated in FIG. 1, patients 35 participating in the insurance network 30 obtain healthcare treatment from the physician practice 25 and pay premiums or insurance payments to the insurance network 30. The medical treatment provided to the patients 35 by the physicians in the physician practice 25 can include prescribing medications. The patients 35, however, obtain the prescription medications from the pharmacy 40 and provide either a full payment or a co-payment for the prescription medications. The patients 35 can then be reimbursed for some or all of the payment for the prescription medications from the insurance network 30.

This arrangement is disadvantageous for the physician practice 25 participating in the insurance network 30 because it requires a great deal of management and organization to follow the requirements of the insurance network 30. The system is even more disadvantageous for the physician practice 25 if it participates in multiple insurance networks 30. Each insurance network 30 maintains a preferred list of prescription medications, for example, that the physician practice 25 may prescribe to the patients 35. Further, each insurance network 30 updates their preferred list of prescription medications on a routine basis. The physician practice 25 in the insurance network 30 generally attempts to spend the majority of their time treating patients 35. The management and organization of the insurance network 30 requirements can be time consuming and eliminate some of the time that a physician practice 25 may normally dedicate to the treatment of patients 35.

Traditionally, there also has been tension between the physician practice 25 and the insurance network 30. The tension can be caused by the insurance network 30 delaying payment to the physician practice 25 with notification of a particular network requirement that has been violated, if any. In addition, the physician practice 25 normally receives very little support from the insurance network 30, such as patient history updates and information on medication costs. Tensions are also sometimes caused by the insurance network's 30 perception that the physician practice 25 over-bills for treatment and does not provide all possible treatment options for patients 35. The physician practice 25 sometimes feel pressured by the insurance network 30 to provide medical treatment to their patients 35 according to the preferences of the insurance network 30 instead of according to their own medical judgments. Of course, the physician practice 25 is free to independently treat the patients 35 in the insurance network 30 based on medical judgment, but the tension between the physician practice 25 and the insurance network 30 still exists.

The physician practice 25 is not bound by the treatment procedures that are preferred by the insurance network 30. Often, however, conflict between the insurance network 30 and the physician practice 25 can arise when the insurance network 30 prefers the physician practice 25 to perform certain medical procedures or prescribe particular medications that are more profitable to the insurance network 30. The physician practice 25 does not have the time necessary to perform exhaustive research necessary to determine if the treatment proposed by the insurance network 30 is feasible, or even safe, to patients 35. Prudent physicians in the physician practice 25 often do not change their treatment practices based simply on information provided by the insurance networks 30.

In the interest of patient safety, physicians in the physician practice 25 should research medical literature to become more educated as to possible benefits of alternative medications. As noted above, however, this takes a great deal of time that can better be used to treat patients 35. In order to conserve the time that might normally be spent on managing and organizing the insurance network 30 requirements, however, some physician practices 35 may hire office managers. This is disadvantageous because an office manager can be extremely costly and will normally need office space. The office space that may be used by the proposed office manager may be an examination room in which the physician would normally treat patients 35. Once again, this cuts down on the number of patients 35 that the physician practice 25 can possibly treat. The office manager also often only manages finances and personnel and has little understanding of physician practices 25 with respect to relationships between insurance networks 30 and physicians' 25 decisions and practices with respect to patients 30.

It has been proposed that the performance of a first healthcare provider can be compared to the performance of a second healthcare provider using a computer program as described in U.S. Pat. No. 5,652,842 titled "Analysis and Reporting of Performance of Service Providers", by Siegrist, Jr. et al. More particularly, a method of monitoring customer satisfaction so as to keep the healthcare providers competitive in many different fields is described. The method described in Siegrist, Jr. at al., however, is disadvantageous to group physicians in organizing and managing healthcare costs that are dependant upon preferred treatment of the insurance network.

When the physician practice 25 is not able to organize and manage medical treatment information in a manner that is preferred by the insurance network 30 in which they participate, there only exist two possible results. Either the physician practice 25 receives lower reimbursements from the insurance network 30, or the insurance network 30 is less profitable. No matter which result occurs, however, the ultimate end result is higher medical costs for patients 35. Therefore, the patients 35 are the real losers in the situations described above.

SUMMARY OF THE INVENTION

With the foregoing in mind, the present invention advantageously provides a system and methods for managing a healthcare practice which optimizes profits of the healthcare practice. The system and methods of the present invention also advantageously assist physicians and insurance providers in providing cost-effective healthcare services to patients. The system and methods of managing the healthcare practice of the present invention additionally advantageously eliminates the time necessary for physicians to conduct exhaustive research in determining if alternative, and more profitable, ancillary medical procedures are beneficial to their patients. The system and methods of the present invention further advantageously assist in controlling the rising costs of medical care by reducing physicians' ancillary medical costs. The system and methods of the present invention still further advantageously strengthens the relationship between physicians and insurance providers by providing an intermediary between the two.

More particularly, the present invention provides a method of managing a healthcare practice participating in an insurance network to optimize profitability of the healthcare practice with respect to a predetermined reimbursement amount for selected ancillary medical costs. The method advantageously includes gathering data from each of a plurality of physicians in the healthcare practice participating in the insurance network regarding management of the selected ancillary medical costs. The method further includes identifying at least one of the plurality of physicians in the healthcare practice participating in the insurance network that is at a greater risk of not receiving the predetermined reimbursement amount for the ancillary medical costs from the insurance network by engaging in ancillary medical procedures that are detrimental to receiving the predetermined reimbursement amount for the ancillary medical costs. The method also includes modifying the at least one physician's management behavior regarding the ancillary medical costs to substantially reduce the risk of not receiving the predetermined reimbursement amount for the ancillary medical costs from the insurance network.

The step of identifying the at least one physician preferably includes analyzing the ancillary medical costs of each of the plurality of physicians in the healthcare practice, calculating an average ancillary medical cost per physician for the healthcare practice, and identifying the physician that has ancillary medical costs that are a predetermined percentage greater than the average ancillary medical cost per physician for the healthcare practice. The step of identifying the at least one physician also advantageously includes identifying the physician having the highest ancillary medical costs in the healthcare practice. The ancillary medical costs can include any costs taken from the group of pharmacy, radiology, laboratory, anesthesiology, occupational therapy, physical therapy, speech therapy, therapeutic radiology, operating room, emergency room costs or other cost centers as understood by those skilled in the art.

The present invention also provides a method of optimizing the profitability of an insurance network having a plurality of physicians in a healthcare practice participating therein by managing ancillary medical costs. The method includes the step of gathering data from each of the plurality of physicians in the healthcare practice participating in the insurance network regarding management of ancillary medical costs. The method also includes the step of modifying the plurality of physicians' in the healthcare practice management behavior regarding ancillary medical costs that are not profitable for the insurance network.

The present invention further provides a healthcare management optimization system for a healthcare practice including a plurality of physicians participating in an insurance network. The healthcare management optimization system includes at least one database. The at least one database can advantageously include a first and a second database. The first database includes information regarding ancillary medical procedures that are preferred by the insurance network and the second database includes information regarding ancillary medical costs of each of the plurality of physicians participating in the insurance network. The healthcare management optimization system further includes an analyzer in communication with the first and second databases for analyzing the data in the first and second databases and comparing the ancillary medical procedures that are preferred by the insurance network with the ancillary medical costs of the plurality of physicians participating in the insurance network to thereby identify ancillary medical costs that are not preferred by the insurance network. The healthcare management system still further includes managing means responsive to the analyzer for managing the ancillary medical costs to thereby modify the ancillary medical costs of the physicians in the healthcare practice to be more profitable to the insurance network.

The present invention still further provides a healthcare management optimization system for a healthcare practice including a plurality of physicians participating in an insurance network. The healthcare optimization network advantageously includes a server having at least one database. The at least one database can advantageously include first and second databases. The system further includes a communications network positioned to be in communication with the server, a plurality of computers positioned to be in communication with the communications network, each including a user interface responsive to a user, an updater positioned on the server and responsive to the user interface updating each of the plurality of physicians in the healthcare practice of any changes in the management of ancillary medical costs that are preferred by the insurance network, and recommending means positioned on the server and responsive to the user interface for recommending to each of the plurality of physicians alternative ancillary medical procedures that are preferred by the insurance network.

The present invention advantageously strengthens the relationship between insurance companies and physicians by providing an intermediary that provides information to make modifications to ancillary medical treatment procedures to both the physicians and the insurance network. The information provided by the intermediary includes scientific and medical research literature and advantageously eliminates the research time and costs necessary for the physicians and the insurance networks to make informed decisions and recommendations regarding patient care. The research necessary to make the informed decisions is advantageously provided to the physicians and the insurance networks.

The present invention also advantageously provides educational information regarding alternative ancillary medical procedures to patients that insist on a particular ancillary medical procedure, i.e., insist on a prescription for a brand name medication, so that the patient can also make a more informed decision as to their treatment. When the patient is made a part of the decision to modify medical care, the patient is more likely to trust both the physician and the insurance network. Therefore, the present invention also advantageously strengthens the relationship between the patients, physicians, and insurance network.

The present invention further advantageously decreases physicians' overall ancillary medical costs, thereby enhancing the profitability of the physician practice groups and insurance networks. Increased savings attributed to ancillary medical costs can advantageously be passed on to patients, thereby decreasing the cost of medical care and co-payments for prescription medications. The present invention allows the patient in the healthcare system to be the real winner.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1A is a schematic view of a relationship between physicians, insurance networks, patients, and a healthcare consultation group according to the present invention;

FIG. 5 is an environmental view of a physician accessing a communications network through a user interface of a system for a healthcare practice to obtain information regarding management of ancillary medical costs according to the present invention;

FIG. 6 is an environmental view of a physician researching an information card positioned in a patient's chart to determine if an alternative ancillary medical procedure is appropriate according to the present invention; and FIGS. 1A-6A illustrate systems and methods of optimizing profitability of healthcare practices and insurance networks by managing ancillary medical costs. As illustrated in FIG. 1A, the present invention preferably includes a healthcare consultation group 22 that forms an intermediary relationship between a healthcare practice 25 and an insurance network 30. The healthcare practice 25 preferably includes a plurality of physicians 27 practicing in one or more medical fields in a particular geographic area. The healthcare consultation group 22 determines the most efficient manner to manage ancillary medical costs to thereby increase profitability of the healthcare practice 25 and the insurance network 30 by decreasing ancillary medical costs. In cases where the financial responsibility for patient care is divided between the insurance network 30 and the healthcare practice 25, the healthcare consultation group 22 can also advantageously manage ancillary medical costs of the insurance network 30 and the healthcare practice 25 to thereby decrease ancillary medical costs, thereby increasing profitability of both the insurance network 30 and the healthcare practice 25. Ancillary medical costs can include pharmacy costs, for example. The ancillary medical costs can also advantageously include any one of a number of medical cost centers such as taken from federally-defined hospital departments. These can include, but are not limited to, anesthesiology, blood, blood storage procedure and administration, radiology, electroencephalogram (EEG), electrocardiogram (EKG), emergency room, IV therapy, organ and tissue acquisition, labor and delivery, medical/surgical supplies, nuclear medicine, occupational therapy, operating room, physical therapy, recovery room, renal dialysis, respiratory therapy, special care, speech therapy, and therapeutic radiology. These general categories also can be broken down into more specific categories as understood by those skilled in the art.

DETAILED DESCRIPTION OF PREFERRED EMBODIMENTS

Figure 1:
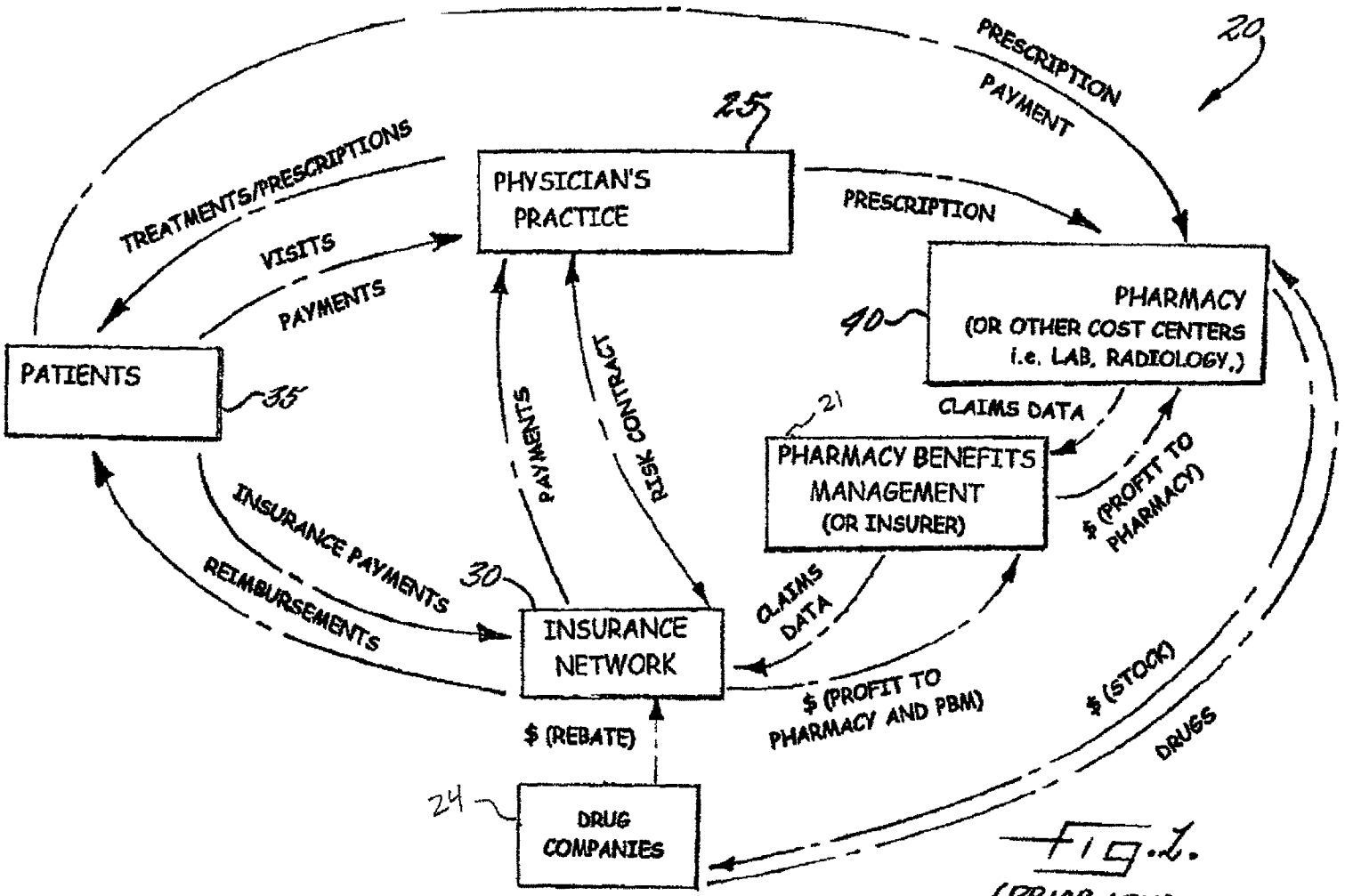
FIG. 1. (PRIOR ART)
FIG. 1 is a schematic view of a typical relationship between physicians, insurance networks, and patients according to the prior art.
Figure 2A:
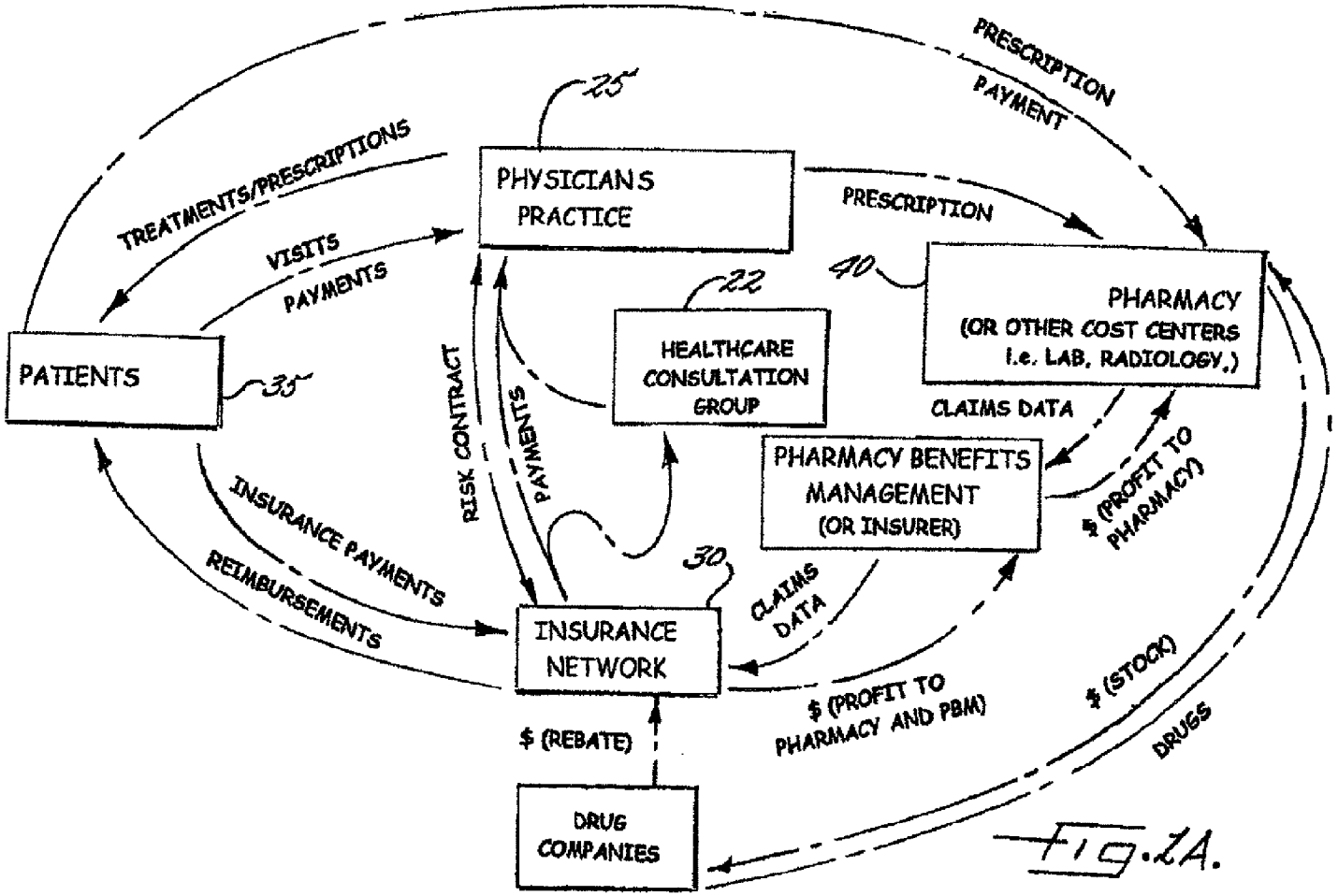
FIG. 2A is a flow chart describing the method of managing ancillary medical costs for healthcare practices and insurance networks according to the present invention.
Figure 2A:
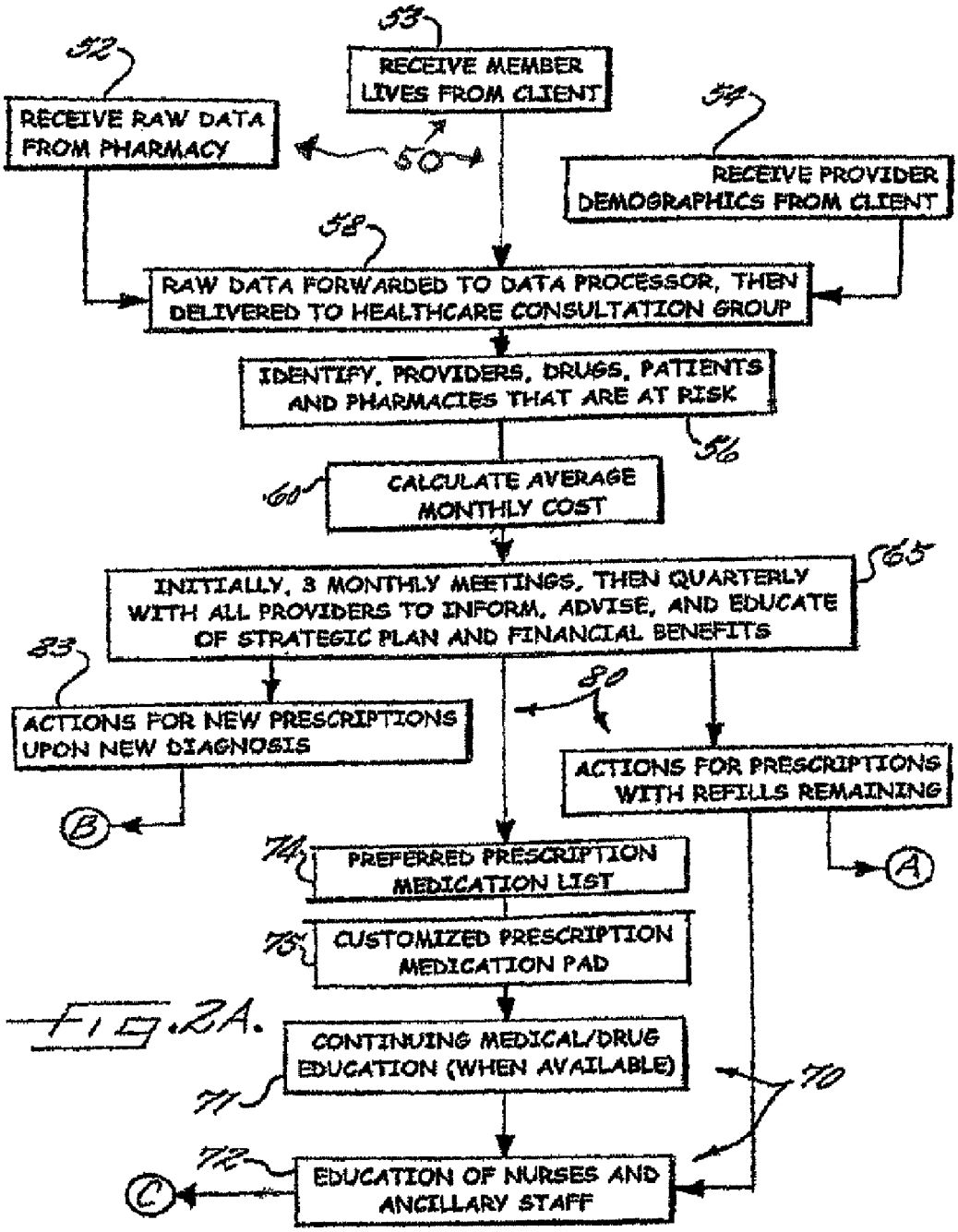
Figure 2B:
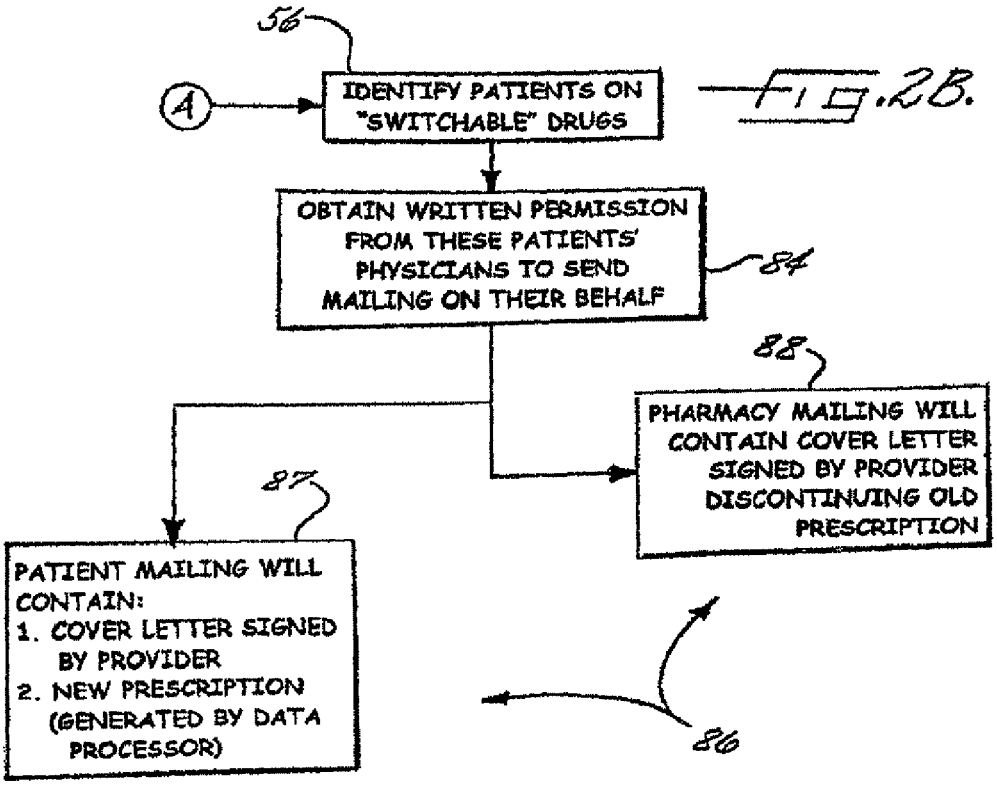
FIG. 2B is a flow chart describing the method of modifying ancillary medical procedures according to the present invention.
Figure 2C:
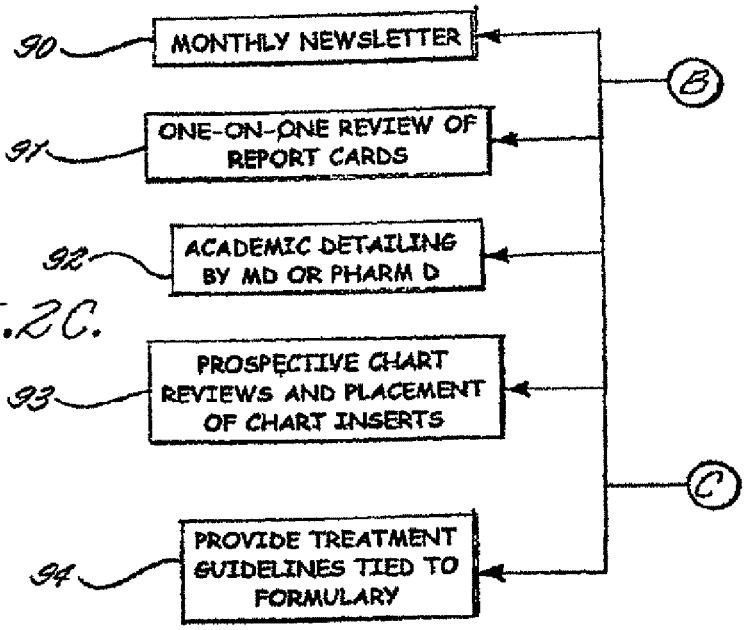
FIG. 2C is a flow chart describing the method of educating physicians on the benefits of alternative ancillary medical procedures according to the present invention.
Figure 3:
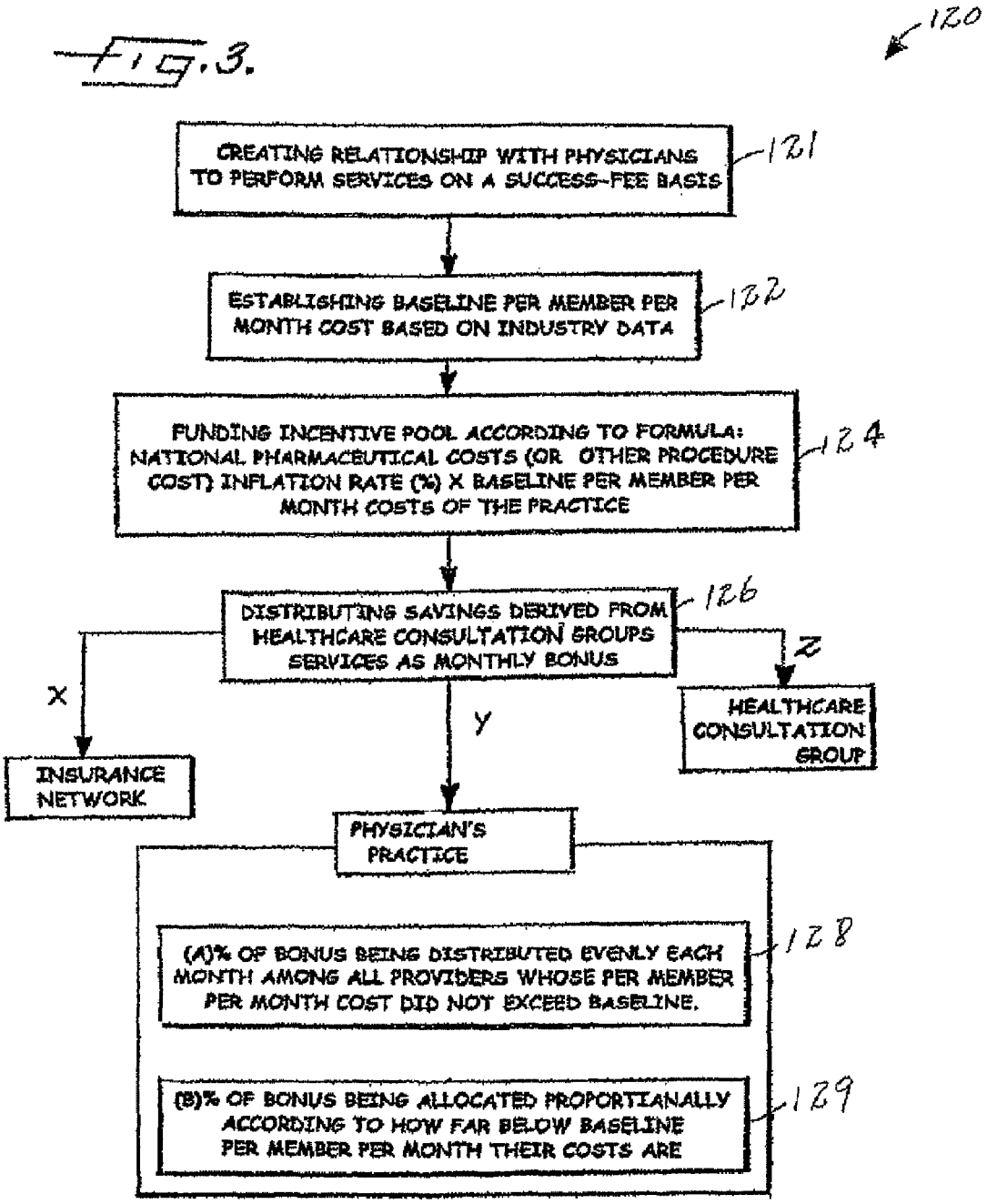
FIG. 3 is a flow chart describing the method of managing ancillary medical costs and optimizing profitability for an insurance network according to the present invention.

As perhaps best illustrated in FIGS. 1A-4, the present invention provides methods for managing a healthcare practice 25 to optimize the prbfitability of the healthcare practice 25 by decreasing the healthcare costs of the healthcare practice 25. As illustrated in FIG. 3, the present invention also provides methods of optimizing the profitability of an insurance network 30 having a plurality of physicians 27 in a healthcare practice 25 participating therein by managing ancillary medical costs, i.e., pharmacy costs, of the healthcare practice 25, or a combination of the healthcare practice 25 and the insurance network 30. The present invention is particularly advantageous for use in association with pharmacy cost because of the large year to year increases in the cost of prescription medications and other pharmaceutical related costs. The method of managing the healthcare practice 25 and the method of optimizing the profitability of the insurance network 30 includes gathering data 50 from each of the plurality of physicians 27 in the healthcare practice 25 participating in the insurance network 30 regarding management of ancillary medical costs. The step of gathering data 50 preferably includes conferring with the healthcare practice 25 and the insurance network 30 to determine 53 the number of patients 35 participating in the insurance network 30 and the current ancillary medical procedure used to treat those patients 35. In a case where the ancillary medical cost is pharmacy cost, for example, the method includes gathering data from the physicians 27 regarding the number of pharmacy claims over a predetermined period of time, the number of patients 35 treated by the physician 27, and demographic information about the physician 27.

Data is also gathered 52 from ancillary medical facilities 40 regarding ancillary medical costs of each of the plurality of physicians 27 in the healthcare practice 25 participating in the insurance network 30. This data can advantageously include claims information, claim types, and cost data regarding the claims. This data can also advantageously be gathered from the healthcare practice 25 or the insurance network 30. The data collected from the ancillary medical facilities 40 can be available on an ancillary medical network database, such as a pharmacy network listing pharmacy costs for each of a plurality of physicians 27 in the healthcare practice 25. Again, in a case where the ancillary medical cost is pharmacy cost, for example, the method of gathering data 50 includes obtaining average wholesale pharmacy costs from pharmacy networks such as First Databank, Red Book, and Blue Book, for example, or any other pharmacy network as understood by those skilled in the art. The step of gathering data 50 from the pharmacy also includes getting monthly updates from the pharmacy network regarding average wholesale pharmacy costs. The step of gathering data 50 further preferably includes extrapolating a contracted price of prescription medications from the pharmacy claims data.

If the ancillary medical cost is pharmacy cost, for example, then the step of gathering data 50 can advantageously include preparing a management report that includes information regarding the physician's pharmacy cost performance measured by per member per month (PMPM) costs. The management report can also advantageously include a physician report card to inform the physician 27 of current performance and high cost patient reports from the physician 27. The report card is advantageously detailed for each physician 27 based on prescribing patterns, costs of management behavior to them and the healthcare practice 25, peer-reviewed alternative prescription medications, and potential savings if followed. The report cards are then presented to the identified physician 27 so that they can perform their own analysis. The healthcare practice 25 can advantageously encourage the physician 27 to give the report consideration. The management report can also advantageously include a list of the top medication providers, e.g., the top fifty high-cost prescription medication providers and a pharmacy cost management report.

The method of managing the healthcare practice 25 and the method of optimizing the profitability of an insurance network both further preferably include identifying 56 at least one physician 27 in the healthcare practice 25 that is engaging in ancillary medical procedures that are not as profitable or preferred by the insurance network 30. Physicians 27 who engage in the ancillary medical procedures that are not preferred by the insurance network 30 are sometimes at risk of not receiving a predetermined reimbursement amount from the insurance network 30. These ancillary medical procedures can include the prescription of medications that are not as profitable to the insurance network 30 or the physicians 27 in the healthcare practice 25. In cases where the financial responsibility for patient 35 care is shared between the healthcare practice 25 and the insurance network 30, then the profitability of both the insurance network 30, and the healthcare practice 25 are enhanced. Typically, alternative medications are available that combat the same illnesses. In some instances, however, either the physician is not familiar with the alternative medication or the patient 35 insists on a particular brand-name medication merely because the brand-name medication has been greatly advertised, marketed, or commercialized.

The step of identifying the at least one physician 56 preferably includes analyzing the data 58 collected from the physicians and the ancillary medical network databases to determine the ancillary medical costs of each physician 27 in the healthcare practice 25. The step of identifying the at least one physician 56 also preferably includes calculating 60 an average ancillary medical cost per physician in the healthcare practice 25. After an average is calculated 60, physicians 27 having ancillary medical costs that fall a predetermined standard deviation away from the average, e.g., two standard deviations from the average of their peers in the healthcare practice 25, are identified 56 and targeted for intervention. Should a point be reached where no physician 27 falls beyond the two standard deviation limit, then a predetermined percentage of the physicians having the highest or higher than average ancillary medical costs will be considered for intervention.

The method of managing the healthcare practice group 20 and optimizing the profitability of an insurance network 30 both further include identifying patients 35 and ancillary medical procedures that have costs above the average ancillary medical cost calculated above. For example, the step of identifying patients 35 whose ancillary medical costs are greater than the average ancillary medical costs per physician 27 can include identifying patients 35 who have pharmacy costs greater than the average pharmacy cost of the physician 27. Another example preferably includes identifying prescription medications having a higher cost man the average prescription medication cost of the healthcare practice 25.

When the physician 27 that has ancillary medical costs greater than the average ancillary medical costs of the healthcare practice 25 is identified, the method of managing the healthcare practice group 20 and optimizing the profitability of on insurance network 30 both further include conferencing with the identified physician 27 to discuss the impact of not taking any action regarding ancillary medical cost overruns.

The method of managing the healthcare practice 20 and the method of optimizing the profitability of an insurance network 30 both further include modifying the physician's management behavior 65 regarding the ancillary medical costs. The physician's management behavior is modified to advantageously reduce the risk of not collecting the predetermined reimbursement amount from the insurance network 30 to thereby increase the physician's profitability. The physician's modified management behavior can also advantageously increase the profitability of the insurance network 30.

The step of modifying the physician's management behavior includes educating 70 the at least one physician 27 on benefits of alternative ancillary medical procedures. The education 70 of the physician 27 can be performed using research literature for comparing the alternative ancillary medical procedures to current ancillary medical procedures. The education 70 can further include organizing continued medical education classes 71 through ancillary medical facilities and can also include the education 72 of nurses and ancillary staff members. This is advantageous because continued medical education classes are generally required in order for a physician 27 to keep licensing requirements current. The continued medical education can advantageously fulfill the physician's licensing requirement while simultaneously educating the physician 27 as to the benefits of alternative ancillary medical procedures that may be more advantageous to themselves as well as to their patients.

The step of educating 70 the at least one physician advantageously includes providing the at least one physician national treatment guidelines for stepwise treatment of disease states. Too often prescription medication representatives, such as sales representatives, convince physicians 27 that the newest medication is necessary to treat patients 35 and other regimens should be skipped or abandoned. The step of educating 70 the physicians 27, therefore, includes recommending that physicians 27 follow nationally recognized guidelines and treatment protocols, such as from the Center for Disease Control (CDC) and the National Institute of Health (NIH), for example.

This advantageously ensures that community accepted standards of care are being provided. The step of educating 70 the physicians 27 also advantageously includes identifying the medications of choice for given disease states and verifying, through data analysis and dialog that medical research indicates that modified physicians behavior will have a favorable impact. The step of educating 70 the physicians 27 using peer-reviewed, medical research based literature recommending nationally recognized guidelines also advantageously decreases liability incurred by physicians 27. The physicians' 27 medical malpractice liability can advantageously be decreased if the physician follows nationally recognized guidelines and treatment protocols.

The step of modifying the physician's management behavior also includes providing patient history updates. If, for example, the physician 27 makes a decision to modify a patient's 35 prescription medication in the interest of decreasing pharmacy cost, for example, the patient history updates become very advantageous for the general safety and welfare of the patient 27. At the time of ordering the new prescription, physicians 27 may not have all the patient's 35 medical history to prescribe a medication without inducing an adverse drug reaction (ADR). ADR's often lead to increased repeat visits to the physician 27 for the same ailment and possibly to a hospital, which increase the healthcare practice's 25 health core cost tremendously. After the gathered data, provided by a pharmacy benefits management (PBM) company or a pharmacy claims benefit administrator, for example, is analyzed, printouts of the patients' 35 prescription history can advantageously be provided to the physician 27. These printouts may be included in patient 35 charts for up-to-date reference by the physicians 27.

As best illustrated in FIG. 2A, the method of managing the healthcare practice 25 and the method of optimizing profitability of the insurance network 30 further includes providing a list of ancillary medical procedures, e.g., a list of preferred prescription medications, that are preferred by the insurance network 30. If the physicians 27 follow the suggested ancillary medical procedure list, the physicians 27 are more likely to receive the predetermined reimbursement from the insurance network 30, thereby providing enhanced profits to the physicians 27 as well as to the insurance networks 30. The enhanced profitability advantageously allows the insurance network 30 and the physicians 27 to provide more cost-effective medical treatment to the patients.

As also illustrated in FIG. 2A, the methods managing the healthcare practice 25 and optimizing probability of the insurance network 30 also advantageously include providing custom ancillary medication procedure forms 75, i.e., custom prescription medication pads, for use by the physician 27 to easily recognize which ancillary medical procedures are preferred by the insurance network 30. For example, the physician 27 is provided a custom prescription medication pad 75 that includes a vast list of prescription medications that are preferred by the insurance network 30. This eliminates the time necessary for the physician 27 to perform research on which medications are preferred by the insurance network 30.

Physicians 27 sometimes participate in a number of insurance networks 30. Differing insurance networks 30 normally have differing preferred ancillary medical procedures. When the physicians 27 participate in differing insurance networks 30, it becomes difficult to determine which ancillary medical procedures are preferred by each of the different insurance networks 30. The various insurance networks 30 normally have overlapping ancillary medical procedures. Therefore, the step of providing custom ancillary medical procedure customization forms also includes the step of providing custom ancillary medical procedure forms that account for the overlapping ancillary medical procedures of the various networks and advantageously eliminate the need for the physician 27 to take the time to research what insurance network 30 the patient 35 participates in and which ancillary medical procedures are preferred by the particular insurance network 30 in which the patient 35 participates. The custom ancillary medical form that accounts for overlapping ancillary medical procedures between various insurance networks 30 advantageously allows the physician 27 to engage in any ancillary medical procedure that is listed on the form without any risk of not receiving the predetermined reimbursement amount from the insurance network 30.

As best illustrated in FIG. 2A-2C the methods of managing a healthcare practice 25 and optimizing profitability of an insurance network 30 of the present invention also include providing patient intervention 80 to enhance the profitability of the physicians 27 and the insurance networks 30. One source of increased ancillary medical costs are unnecessary patient requests. The patients 35 sometimes request particular ancillary medical procedures because of a lack of knowledge regarding alternative ancillary medical procedures. For example, some patients 35 insist on brand-name medications that are largely commercialized without having the requisite knowledge to make an informed decision regarding alternative ancillary medications. The step of providing patient intervention 80 advantageously includes identifying 56 the patients who participate in ancillary medical procedures that are not preferred by the insurance network 30 and put the physician 27 at risk of not receiving a predetermined reimbursement from the insurance network 30. The method of providing the patient intervention 80 also advantageously includes discontinuing the current ancillary medical procedure and amending it with a new ancillary medical procedure that is preferred by the insurance network 30 and reduces the risk of the physician 27 not receiving the predetermined reimbursement amount from the insurance network 30.

The step of providing patient intervention can advantageously include contacting patients 35 that are affected by poly-pharmacy and non-compliance, for example. The step of contacting patients includes contacting the patients 35 on a monthly basis. Poly-pharmacy occurs when the patient 35 is taking medications with ADR's, unnecessary medications, or those from the same medication class. In addition, if it is discovered during the step of analyzing the gathered data that the patient 35 is not taking the prescription medication as required, the step further includes contacting the patient 35 with a directive to comply with the treatment protocols. The contact to the patient 35 can, for example, be made in the form of a letter written on the physician's 27 letterhead.

The step of providing patient intervention also advantageously includes determining if stronger disease state management techniques are required. This determination is conducted on a monthly basis. For those patients 35 with aggressive diseases, specialist organizations are employed to provide recommendations to the physicians 27 and the patients 35 on the latest treatments techniques.

The steps of discontinuing and amending current ancillary medical procedures include providing information to the patients 35 regarding the benefits of the new alternative medical procedure, e.g., information that a lay-patient can understand regarding the benefits of an alternative prescription medication. The step of providing patient intervention also includes providing a monthly review of patient's charts to determine if the new ancillary medical procedures are sufficient for the patient's treatment. As patients are identified 56 that are not being treated per guidelines of alternative ancillary medical procedures, a chart 48 is advantageously inserted into a patient's medical chart, recommending an alternative ancillary medical procedure. The chart insert 48 advantageously includes an explanation of the recommended and pre-written ancillary medical procedure orders, i.e., pre-written prescriptions, for the physician's approval.

The physicians 27, however, do not always yield to the preferred ancillary medical procedures of the insurance network 30. When the physicians 27 encounter a situation where, relying on their vast medical knowledge, they know a proposed ancillary medical procedure is detrimental to the patient 35, then the insurance network 30 is approached to consider modifying their preferred ancillary medical procedures. Like the physicians 27, the insurance network 30 is educated regarding the benefits of the ancillary medical procedure that they seek to modify. This advantageously levels the playing field between physicians 27 and insurance networks 30. The present invention provides for the possibility that the insurance network 30 will yield to the medical judgment of the physician 27 concerning the treatment of patients 35.

The step of discontinuing an ancillary medical procedure further includes the step of preparing a plurality of letters 86. The step of preparing letters includes the healthcare consultation group 22 obtaining permission 84 from the physician 27 to distribute letters 87 to the patients 35 that are candidates for modification of ancillary medical procedures. One of the plurality of letters informs the ancillary medical facility of the discontinuation of a particular ancillary medical procedure 88. Another of the plurality of letters informs the patient that a particular ancillary medical procedure is discontinued 87. The letters can advantageously be written on the physician's letterhead. The letter to be sent to the patient 35 advantageously includes a detailed explanation of why the ancillary medical procedure is being modified, the benefits of the new ancillary medical procedure, and the advantages that patient 35 will obtain from using the new ancillary medical procedures. The letter to be sent to the ancillary medical facility 88 instructs the ancillary medical facility that the ancillary medical procedure is discontinued and can also advantageously inform me ancillary medical facility of an amendment to the ancillary medical procedure. The step of discontinuing the ancillary medication also includes providing the physician 27 with a list of "frequently asked questions and answers" so that the physician 27 is prepared for what may be difficult questions posed by the patients 35. This advantageously allows the physician 27 to give the patients 35 clear and concise answers that do not make the patient 35 feel as though the physician 27 and the insurance network 30 are taking advantage of the patient.

The step of providing patient intervention also advantageously includes ordering a new alternative ancillary medical procedure upon a new diagnosis 83. The step of ordering a new ancillary medical procedure advantageously includes providing a monthly update 90 to the physicians 27 regarding new alternative ancillary medical procedures. The monthly updates can come in the form of a newsletter, for example. The step of ordering a new ancillary medical procedure also advantageously includes providing a review 91 between the physician 27 and the healthcare consultation group 25 regarding new ancillary medical procedures and education 92 provided to the physicians 27 and patients 35 regarding the new ancillary medical procedures. The patient's chart is periodically reviewed 93 to ensure that the new ancillary medical procedure is effective and treatment guidelines are provided 94 on a chart insert 48, as illustrated in FIG. 6A.

The methods of managing the healthcare practice 25 and optimizing the profitability of the insurance network 30 also advantageously include updating physicians 27 regarding changes of ancillary medical procedures preferred by the insurance network 30. The step of updating can advantageously include mailing the updated changes to each of the physicians 27 in the healthcare provider group 22 using a newsletter 90, or can advantageously include transmitting the changes to the physicians 27 via electronic mail or flyers, or other types of updates. The step of updating can also advantageously include connecting to a communications network 100 to access the updated information. This advantageously eliminates the time necessary for the physicians 27 to research new preferred ancillary medical procedures. The updates are also a form of continuing education for the physician 27 to learn of new techniques and medications that are available to enhance the treatment of the patients 35.

Some healthcare practices 25 have opted to use personal digital assistants (PDAs) or other electronic data entry and retrieval hardware in their practices. For those groups, whenever possible, the hardware and/or software will be integrated with the information and services provided as described above. Allscripts, Parkstone, and Realtime Rx are just a few examples of companies that sell or lease such equipment. This will be done in an effort to disencumber the physicians 27 so they can focus on better management of their time.

Figure 4:
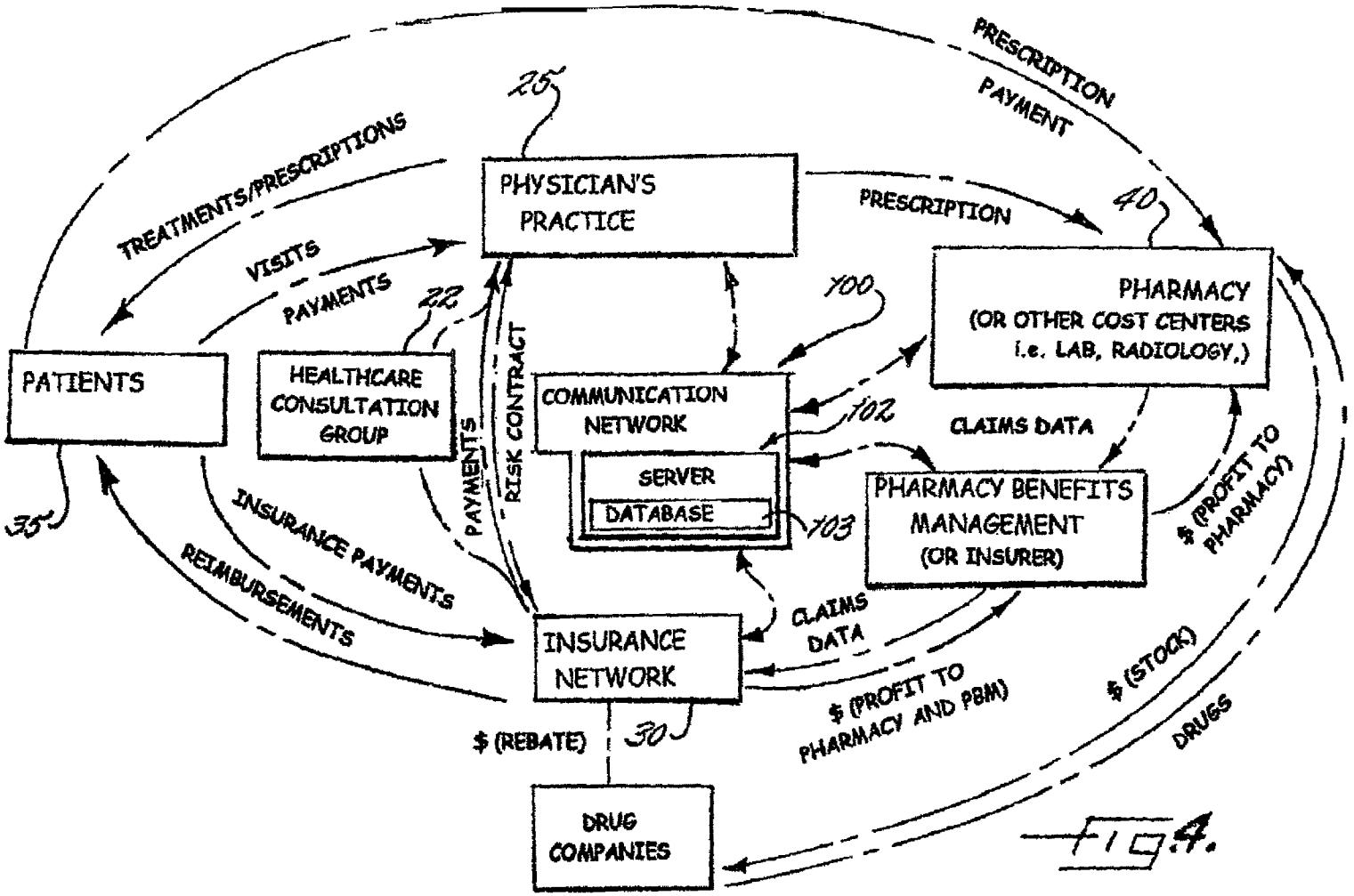
FIG. 4 is a schematic view of a system for a healthcare practice including a plurality of physicians participating in an insurance network according to the present invention.
Figures 5, 6, 6A:
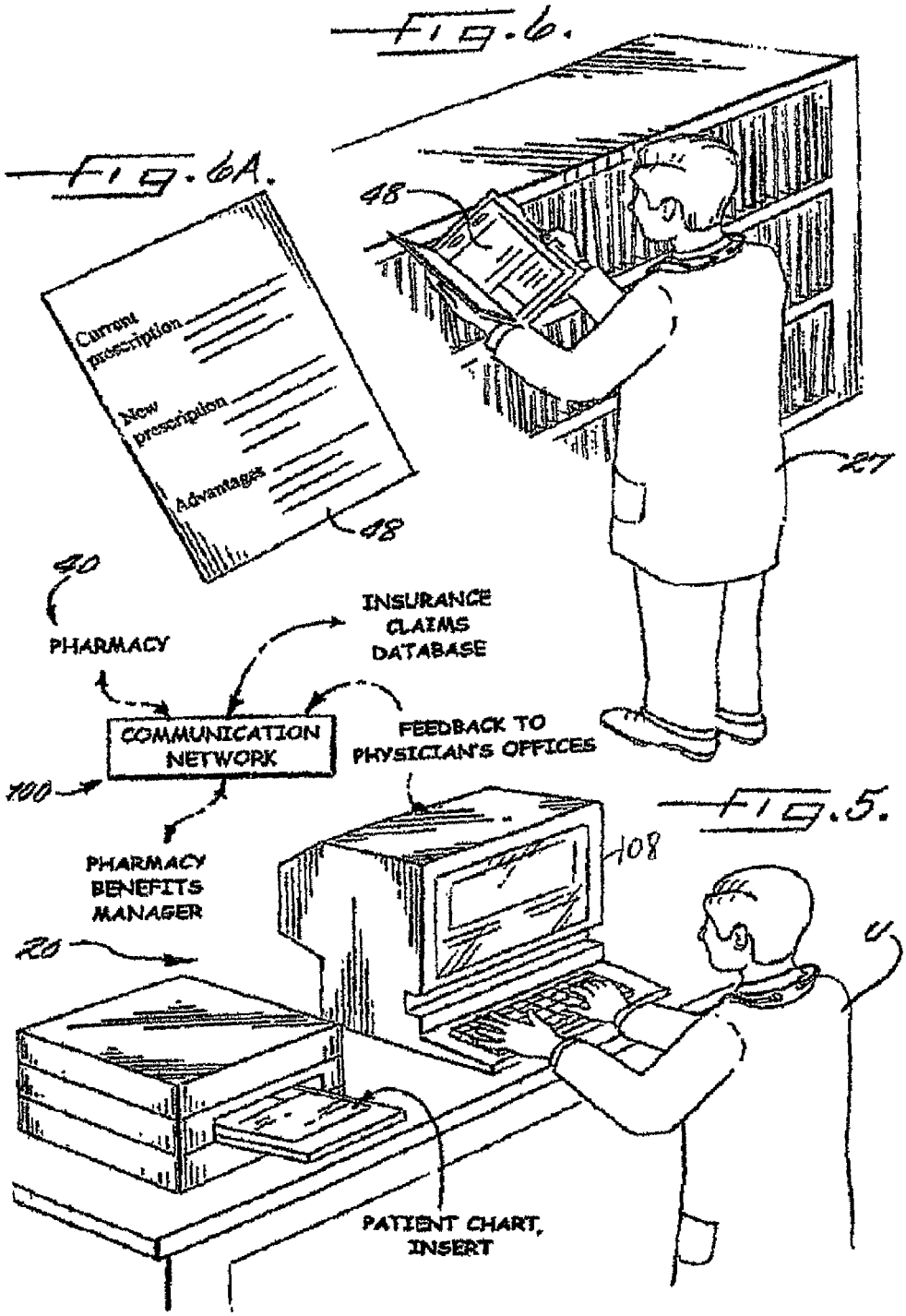

As best illustrated in FIGS. 1A, 4 and 5, the present invention advantageously includes a healthcare management optimization system 20 for a healthcare practice 25 including a plurality of physicians 27 participating in an insurance network 30. The system can advantageously include a server 102 with a database 103 and a communications network 100. The system 20 also preferably includes a plurality of computers 108 positioned to be in communication with the communications network 100, each including a user interface responsive to a user. The database 103 can advantageously include first and second databases. The first database includes information regarding preferred ancillary medical procedures of an insurance network. The second database includes ancillary medical costs of a plurality of physicians 27 participating in the insurance network 30. The system further includes an updater positioned on the server 102 and responsive to the user interface for updating each of the plurality of physicians 27 on any changes of preferred ancillary medical procedures preferred by the insurance network 30.

The system 20 of the present invention also includes an analyzer such as provided by software programs stored on a computer or processor, as understood by those skilled in the art, positioned on the server 102 and in communication with the first and second databases for comparing the ancillary medical procedures that are preferred by the insurance network 30 with the ancillary medical costs of the plurality of physicians 27 participating in the insurance network 30. The analyzer advantageously identifies ancillary medical costs of the physicians 27 that are not preferred by the insurance network 30. The analyzer further includes calculating means for calculating an average ancillary medical cost per physician 27 for the healthcare practice 25. The average ancillary medical cost is used to identify the physicians 27 that are in need of assistance to reduce the risk of not receiving the predetermined reimbursement amount for ancillary medical costs from the insurance network 30.

The system 20 still further includes recommending means, e.g., provided by software, as understood by those skilled in the art, positioned on the server 102 and responsive to the user interface, for recommending to each of the plurality of physicians 27 alternative ancillary medical procedures that are preferred by the insurance network 30. The recommending means can advantageously be provided by software that resides on the server 102. The system also preferably includes managing means, e.g., provided by software as understood by those skilled in the art, for managing ancillary medical cost management behavior of the physicians 27. The managing means can advantageously be provided by software that resides on the server 102. The managing means preferably includes a modifier to modify the management behavior of the physicians 27 so that the physicians 27 engage in ancillary medical procedures that are preferred by the insurance network 30. The managing means also includes an identifier for identifying at least one of the plurality of physicians 27 in the healthcare practice 25 participating in the insurance network 30 that is at a greater risk of not receiving a predetermined reimbursement amount for the ancillary medical costs from the insurance network 30 because of engagement in ancillary medical procedures that are not as profitable to the insurance network 30.

The system 20 of the present invention still further includes patient intervening means, e.g., provided by software, as understood by those skilled in the art, for identifying at least one patient 35 whose present ancillary medical procedures are not preferred by the insurance network 30. The patient intervening means can advantageously be provided by software that resides on the server 102. The management means of the system 20 further includes generating means, e.g., also preferably provided by software, as understood by those skilled in the art, for generating a plurality of letters to modify the ancillary medical procedures of the physician 27. The letters include first and second letters. The first letter informs the ancillary medical facility that the patient's 35 present ancillary medical procedure is modified. The second letter is sent to the patient 35 to inform the patient of the new ancillary medical procedure. The second letter includes educational information informing the patient 35 of the benefits of the new ancillary medical procedure and educational materials that may answer any questions that the patient 27 may have.

As illustrated in FIG. 3, the present invention also provides methods of collecting fees 120 for managing and optimizing the profitability of a plurality of physicians 27 in a healthcare practice 25 and for managing and optimizing the profitability of an insurance network 30. The method includes establishing a relationship 122 between a healthcare consultation group 22, a plurality of physicians 27 in a healthcare practice 25, and an insurance network 30. This advantageously provides a team working towards a common goal, i.e., a team working towards the goal of enhancing profitability through better and more cost-effective healthcare. The newly established relationship can be used to modify the physicians' ancillary medical cost management behavior to enhance the profitability of the insurance network 30 and to reduce the physician's 27 risk of not receiving a predetermined reimbursement amount for ancillary medical costs from the insurance network 30.

The method of collecting fees 120 can advantageously include the step of the healthcare consultation group 22 funding an incentive pool 124 to be paid to the healthcare practice 25, or to the insurance network 30, depending upon who hires the healthcare consultation group 22. The healthcare consultation group 22 only collects a fee if their services to the healthcare practice 25 and the insurance network 30 are successful. Therefore, the fees are only collected on a success-fee basis. In some cases, however, a nominal fee may be charged by the healthcare consultation group 22 before services are performed. The measure of success of the services of the healthcare consultation group 22 is a decrease in healthcare costs of the insurance network 30 and the physicians 27 in the healthcare practice 25 for specific ancillary medical costs. If services of the healthcare consultation group 22, however, do not decrease healthcare costs for the plurality of physicians 27 or the insurance network 30 below a predetermined level over a preselected period of time, the funds in the incentive pool are turned over to the healthcare practice 25 or the insurance network 30, depending on who is the healthcare consultation group's 22 client. This advantageously provides accountability to the healthcare consultation group 22. Accountability will ease the minds of the healthcare practice 25 and insurance network 30 giving the healthcare consultation group 22 a chance to prove that profits can be enhanced.

The method of collecting fees 120 further includes distributing predetermined percentages 126 of savings attributed to the services of the healthcare consultation group 22. As illustrated in FIG. 3, the savings are distributed to the healthcare practice Y, the healthcare consultation group Z, and the insurance network X. For example, the percentages can be 40% to the consultation group. Clearly these percentages can vary depending on the client of the consulting group and an agreement between the parties. This arrangement advantageously allows all involved to gain, including patients, through more cost-effective medical care. The predetermined percentage that is distributed to the healthcare practice Y can advantageously be further distributed 128 in predetermined percentages evenly to the healthcare practice 25 or allocated proportionately according to the savings 129 of each of the plurality of physicians 27 in the healthcare practice 25.

The step of distributing predetermined percentages 126 of savings attributed to the services of the healthcare consultation group 22 can advantageously vary depending on whether the client of the healthcare consultation group 22 is the healthcare practice 25 or the insurance network 30. The distributed percentages can advantageously be equal between the healthcare consultation group 22, the insurance network 30, and the healthcare practice 25. If, for example, the client of the healthcare consultation group 22 is the healthcare practice 25, then the predetermined percentages distributed to the healthcare consultation group 22 and the healthcare practice 25 can be greater than the predetermined percentage of the savings that are distributed to the insurance network 30, e.g., the insurance network 30 may not collect any percentage of the savings. If, however, the client of the healthcare consultation group 22 is the insurance network 30, then the predetermined percentages distributed to the healthcare consultation group 22 and the insurance network 30 can be greater than the predetermined percentage of the savings that are distributed to the healthcare practice 25.

The method of collecting fees can also advantageously include a pricing, billing, or charging structure. The pricing structure of the healthcare consultation group 22 is straight forward. The clients, i.e., the healthcare practice 25 or the insurance network 30, measure their ancillary medical costs, or pharmacy costs for example, on a per-member per-month (PMPM) basis. During a pharmacy assessment, an average PMPM pharmacy cost (baseline PMPM) is calculated using the clients past six months pharmacy claims and membership data. Each month, the current month's average PMPM pharmacy cost is subtracted from baseline PMPM in order to determine the savings realized from the healthcare consultation group's 22 services.

A commission fee can advantageously be calculated on predetermined percentage of the monthly client savings, e.g., 50% of monthly savings, multiplied by the number of patients each month. For example, a sustained $1.00 PMPM savings for a client with 30,000 covered lives would yield to the healthcare consultation group 22 $15,000 per month, for up the duration of the contract. The contract can span between one and three years, for example, or can have a longer duration. The healthcare consultation group 22 can collect a smaller fee percentage for longer contract durations. If the client desires a longer contract duration, the baseline PMPM can advantageously be increased yearly with respect to annual inflation increases of wholesale prescription medication costs. The risk reversal for the client is that if there is no savings any month, the client pays nothing.

The pricing structure can also advantageously include a referral commission, e.g., $0.25, for each covered life, or a percentage of the client's savings for example, provided to the strategic marketing partners. This referral commission compensates for the commissions aid to sales people and people who refer business to the healthcare consultation group 22. Thus, the healthcare consultation group 22 minimizes the marketing budget while advantageously maximizing marketing results.

The application is related to U.S. patent application Ser. No. 09/812,703, now U.S. Pat. No. 7,401,027, titled "Methods For Collecting Fees For Healthcare Management Group" filed on the same date herewith by the same inventors, which is incorporated herein by reference in its entirety.

In the drawings and specification, there has been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. A method of managing a healthcare practice participating in an insurance network to enhance profitability of the healthcare practice with respect to a predetermined reimbursement amount for ancillary pharmacy costs, the method comprising:

gathering data in a tangible computer medium from each of a plurality of physicians in the healthcare practice participating in the insurance network including pharmacy costs other than those attributed to a medical procedure performed directly by any of the plurality of physicians when the respective physician directly administers a medication to a patient to thereby define ancillary pharmacy costs;

analyzing the gathered data *by a computer*;

identifying responsive to the analysis *by the computer,* at least one of the plurality of physicians in the healthcare practice participating in the insurance network that is at a greater risk of not receiving the predetermined reimbursement amount for the ancillary pharmacy costs from the insurance network by prescribing medications that are detrimental to receiving the predetermined reimbursement amount for the ancillary pharmacy costs;

after the step of identifying, modifying ancillary pharmacy costs management behavior of the at least one of the plurality of physicians at the greater risk regarding the ancillary pharmacy costs; and determining that the risk of not receiving the predetermined reimbursement amount for the ancillary pharmacy costs from the insurance network has been reduced to increase the profitability of the healthcare practice.

2. The method as defined in claim 1, wherein the step of gathering data in the tangible computer medium includes gathering information regarding the ancillary pharmacy costs of each of the plurality of physicians in the healthcare practice participating in the insurance network from a database associated with a pharmacy network, the database positioned on a server in communication with each of a plurality of pharmacies in the pharmacy network participating in the insurance network.

3. The method as defined in claim 1, wherein the step of identifying the at least one physician comprises analyzing the ancillary pharmacy costs of each of the plurality of physicians in the healthcare practice, calculating an average ancillary pharmacy cost per physician for the healthcare practice, and identifying the physicians that have ancillary pharmacy costs that are a predetermined percentage greater than the average ancillary pharmacy costs per physician for the healthcare practice.

4. The method as defined in claim 1, wherein the step of identifying the at least one physician comprises selecting the physician having the highest ancillary pharmacy costs within the healthcare practice.

5. The method as defined in claim 1, wherein the step of modifying the at least one physician's management behavior regarding the ancillary pharmacy costs comprises educating the at least one physician on the benefits of alternative prescription medications using research literature for comparing the alternative medications to the prescribed medications and organizing continued medical education classes to educate each of the plurality of physicians in the healthcare practice on the benefits of the alternative prescription medications.

6. The method as defined in claim 5, wherein the step of modifying the at least one physician's management behavior further comprises preparing a list of prescription medications that the at least one physician may prescribe that enable the at least one physician to receive the predetermined reimbursement amount for the ancillary pharmacy costs.

7. The method as defined in claim 6, wherein the step of modifying the at least one physician's management behavior further comprises providing custom prescription medication forms that include the list of prescription medications that the at least one physician may prescribe that enable the at least one physician to receive the predetermined reimbursement amount for the ancillary pharmacy costs.

8. The method as defined in claim 7, wherein the insurance network comprises one of the plurality of insurance networks, wherein the at least one physician participates in the plurality of insurance networks, and wherein the step of modifying the at least one physician's management behavior further comprises preparing a list of common prescription medications that are approved by each of the plurality of insurance networks so as to enable the at least one physician to receive the predetermined reimbursement amount for the ancillary pharmacy costs.

9. The method as defined in claim 7, wherein the step of modifying the at least one physician's management behavior further comprises analyzing a patient's prescription history to thereby avoid possible adverse prescription medication reactions.

10. The method as defined in claim 9, further comprising providing patient intervention to modify the at least one physician's management behavior, the patient intervention including identifying at least one patient whose present prescription medications put the at least one physician at risk for not receiving the predetermined reimbursements for the ancillary pharmacy costs, amending the at least one patient's present prescription medications to decrease the at least one physician's risk of not receiving the predetermined reimbursements for the ancillary pharmacy costs, and discontinuing the at least one patient's present prescription medications that put the at least one physician at risk for not receiving the predetermined reimbursements for the ancillary pharmacy costs.

11. The method as defined in claim 10, wherein the step of discontinuing the at least one patient's present prescription medications further includes preparing first and second letters on the at least one physician's letterhead, the first letter informing the pharmacy that the at least one patient's present prescription medication is discontinued and the second letter informing the at least one patient that the patient's present prescription medication is discontinued, wherein the first and second letters are reviewed for accuracy, signed by the physician, and transmitted to the pharmacy.

12. The method as defined in claim 1, further comprising updating each of the plurality of physicians in the healthcare practice of any changes in the management of ancillary pharmacy costs from the insurance network.

13. A method of managing a healthcare practice participating in an insurance network to enhance profitability of the healthcare practice with respect to a predetermined reimbursement amount for medical costs other than those attributed directly to a medical procedure performed by a physician to thereby define ancillary medical costs, the method comprising:

gathering data in a tangible computer medium from each of a plurality of physicians in the healthcare practice participating in the insurance network including ancillary medical costs;

analyzing the gathered data *by a computer*;

identifying responsive to the analysis *by the computer,* at least one of the plurality of physicians in the healthcare practice participating in the insurance network that is at risk of not receiving the predetermined reimbursement amount for the ancillary medical costs from the insurance network by engaging in medical procedures other than those attributed directly to a medical procedure performed by a physician and that are detrimental to receiving the predetermined reimbursement amount for the ancillary medical costs;

after the step of identifying, modifying management behavior of the at least one of the plurality of physicians at risk regarding the ancillary medical costs; and determining that the risk of not receiving the predetermined reimbursement amount for the ancillary medical costs from the insurance network has been reduced to increase the profitability of the healthcare practice.

14. The method as defined in claim 13, wherein the step of gathering data in the tangible computer medium includes gathering information regarding the ancillary medical costs of each of the plurality of physicians in the healthcare practice participating in the insurance network from databases associated with ancillary medical networks, the databases positioned on servers in communication with each of a plurality of ancillary medical facilities participating in the ancillary medical networks.

15. The method as defined in claim 13, wherein the step of identifying the at least one physician comprises analyzing the ancillary medical costs of each of the plurality of physicians in the healthcare practice, calculating an average ancillary medical cost per physician for the healthcare practice, and identifying the physicians that have ancillary medical costs that are a predetermined percentage greater than the average ancillary medical cost per physician for the healthcare practice.

16. The method as defined in claim 13, wherein the step of identifying the at least one physician comprises selecting the physician having the highest ancillary medical costs within the healthcare practice.

17. The method as defined in claim 13, wherein the step of modifying the at least one physician's management behavior comprises educating the at least one physician on benefits of alternative ancillary medical procedures using research literature for comparing the alternative ancillary medical procedures to current ancillary medical procedures; and wherein the method further comprises organizing continued medical education classes through ancillary medical facilities to educate each of the plurality of physicians in the healthcare practice on the benefits of the alternative ancillary medical procedures.

18. The method as defined in claim 17, wherein the step of modifying the at least one physician's management behavior further comprises preparing a list of ancillary medical procedures that the at least one physician may engage in that enable the at least one physician to receiving the predetermined reimbursement amount for the ancillary medical costs.

19. The method as defined in claim 18, wherein the step of modifying the at least one physician's management behavior further comprises providing custom ancillary medical procedure forms that include the list of ancillary medical procedures to thereby define custom ancillary medical procedure forms and that the at least one physician should engage in to further enable the at least one physician to receive the predetermined reimbursement amount for the ancillary medical costs.

20. The method as defined in claim 13, wherein the insurance network comprises one of the plurality of insurance networks, the at least one physician participates in the plurality of insurance networks, and wherein the step of modifying the at least one physician's management behavior further comprises preparing a list of common ancillary medical procedures that are approved by each of the plurality of insurance networks so as to enable the at least one physician to receive the predetermined reimbursement amount for the ancillary medical costs.

21. The method as defined in claim 20, further comprising providing patient intervention to modify the at least one physician's management behavior, the patient intervention including identifying at least one patient whose present ancillary medical procedures put the at least one physician at risk for not receiving the predetermined reimbursements for the ancillary medical costs, amending the at least one patient's present ancillary medical procedures to decrease the at least one physician's risk of not receiving the predetermined reimbursements for the ancillary medical costs, and discontinuing the at least one patient's present ancillary medical procedures that put the at least one physician at risk for not receiving the predetermined reimbursements for the ancillary medical costs.

22. The method as defined in claim 21, wherein the step of discontinuing the at least one patient's ancillary medical procedures further includes preparing first and second letters on the at least one physician's letterhead, the first letter informing the ancillary medical facility that the at least one patient's present ancillary medical procedures are discontinued and the second letter informing the at least one patient that the patient's present ancillary medical procedures are discontinued, wherein the first and second letters are reviewed for accuracy, signed by the physician, and transmitted to the ancillary medical facility.

23. The method as defined in claim 20, further comprising updating each of the plurality of physicians in the healthcare practice of any changes in the management of ancillary medical costs from the insurance network.

24. The method as defined in claim 20, wherein the ancillary medical costs include any costs taken from the group of pharmacy, anesthesiology, blood, blood storage procedure and administration, radiology, electroencephalogram, electrocardiogram, emergency mom, intravenous therapy, organ and tissue acquisition, labor and delivery, medical/surgical supplies, nuclear medicine, occupational therapy, operating room, physical therapy, recovery room, renal dialysis, respiratory therapy, special care, speech therapy, or therapeutic radiology.

25. A method of optimizing the profitability of an insurance network having a plurality of physicians in a healthcare practice participating therein by managing ancillary medical costs, the method comprising the steps of:

gathering data in a tangible computer medium from each of the plurality of physicians in the healthcare practice participating in the insurance network including management of medical costs other than those attributed directly to medical procedures performed by any of the plurality of physicians to thereby define ancillary medical costs;

analyzing the gathered data *by a computer*;

identifying responsive to the analysis *by the computer,* at least one of the plurality of physicians in the healthcare practice participating in the insurance network that is at risk of not receiving a predetermined reimbursement amount for the ancillary medical costs from the insurance network by performing activities that are detrimental to receiving the predetermined reimbursement amount for the ancillary medical costs;

after the step of identifying, modifying management behavior of the at least one of the plurality of [physicians'] *physicians* in the healthcare practice regarding ancillary medical costs that are not profitable for the insurance network responsive to the gathered data; and providing a financial incentive to the insurance network and the plurality of physicians in the healthcare practice participating in the insurance network to modify [the plurality of physicians'] *ancillary medical costs* management behavior of [ancillary medical costs that are] *the plurality of physicians that is* not as profitable to the insurance network.

26. The method as defined in claim 25, wherein the step of gathering data in the tangible computer medium includes gathering information regarding the ancillary medical costs of each of the plurality of physicians participating in the insurance network from databases associated with a plurality of medical networks other than those attributed directly to the plurality of physicians to thereby define a plurality of medical networks, the databases positioned on servers in communication with each of a plurality of ancillary medical facilities participating in the ancillary medical networks and other than those facilities attributed directly to the plurality of physicians to thereby define a plurality of ancillary medical facilities.

27. The method as defined in claim 25, wherein the step of identifying includes the step of identifying at least one of the plurality of physicians in the healthcare practice participating in the insurance network whose management of ancillary medical costs is not profitable to the insurance network.

28. The method as defined in claim 27, wherein the step of identifying the at least one of the plurality of physicians whose management of ancillary medical costs is not profitable to the insurance network includes the steps of calculating an average ancillary medical cost per physician for the healthcare practice, and identifying the physicians that have ancillary medical costs that area predetermined percentage greater than the average ancillary medical cost per physician for the healthcare practice.

29. The method as described in claim 27, wherein the step of identifying the at least one of the plurality of physicians includes selecting the at least one of the plurality of physicians having the highest ancillary medical costs within the healthcare practice.

30. The method as defined in claim 26, wherein the step of modifying the plurality of physicians' management behavior regarding ancillary medical costs that are not profitable for the insurance network includes educating the plurality of physicians on benefits of alternative medical procedures other than those performed directly by one of the plurality of physicians to thereby define ancillary medical procedures using research literature for comparing the alternative ancillary medical procedures with current ancillary medical procedures and further comprises organizing continued medical education classes through the ancillary medical facilities to educate each of the plurality of physicians in the healthcare practice on the benefits of the alternative ancillary medical procedures.

31. The method as defined in claim 30, wherein the step of modifying the plurality of physicians' management behavior further comprises preparing a list of the ancillary medical procedures that the plurality of physicians should engage in that are more profitable to the insurance network.

32. The method as defined in claim 31, wherein the step of modifying the plurality of physicians' management behavior further comprises providing custom medical procedure forms that include the list of the ancillary medical procedures to thereby define custom ancillary medical procedure forms and that the plurality of physicians should engage in that are more profitable to the insurance network.

33. The method as defined in claim 32, further comprising providing patient intervention to modify the [plurality of physicians'] management behavior *of the plurality of physicians*, the patient intervention including identifying at least one patient whose present ancillary medical procedures are not as profitable for the insurance network and amending the at least one patient's present ancillary medical procedures to ancillary medical procedures that are more profitable to the insurance network.

34. The method as defined in claim 33, wherein the step of amending the at least one patient's present ancillary medical procedures further includes preparing first and second letters on the plurality of physicians' letterhead, the first letter informing the ancillary medical facility that the at least one patient's present ancillary medical procedures are amended to new ancillary medical procedure and the second letter informing the at least one patient that the patient's present ancillary medical procedures are amended to the new ancillary medical procedures, wherein the first and second letters are reviewed for accuracy, signed by the physician, and transmitted to the respective ancillary medical facility and the at least one patient.

35. The method as defined in claim 30, further comprising updating each of the plurality of physicians in the healthcare practice of new ancillary medical procedures that are more profitable to the insurance network.

36. The method as defined in claim 25, wherein the ancillary medical costs include any costs taken from the group of pharmacy, anesthesiology, blood, blood storage procedure and administration, radiology, electroencephalogram, electrocardiogram, emergency room, intravenous therapy, organ and tissue acquisition, labor and delivery, medical/surgical supplies, nuclear medicine, occupational therapy, operating room, physical therapy, recovery room, renal dialysis, respiratory therapy, special care, speech therapy, or therapeutic radiology.

37. A healthcare management optimization system for a healthcare practice including a plurality of physicians participating in an insurance network comprising:

a first database comprising medical procedures other than those performed directly by any of the plurality of physicians to thereby define ancillary medical procedures that are preferred by the insurance network;

a second database comprising medical costs other than those attributed directly to medical procedures performed by any of the plurality of physicians to thereby define ancillary medical costs of each of the plurality of physicians participating in the insurance network; and computer executable program product stored on a tangible computer medium, comprising:

an analyzer in communication with the first and second databases for analyzing the data in the first and second database and comparing the ancillary medical procedures that are preferred by the insurance network with the ancillary medical costs of the plurality of physicians participating in the insurance network to thereby identify ancillary medical costs of the physicians that are not preferred by the insurance network, and managing means responsive to the analyzer for managing the ancillary medical costs of the healthcare practice identified as not being preferred by the insurance network to thereby modify the ancillary medical costs of the physicians in the healthcare practice to be more profitable to the insurance network, the managing means including an identifier for identifying responsive to the analyzer at least one of the plurality of physicians in the healthcare practice participating in the insurance network that is at a greater risk of not receiving a predetermined reimbursement amount for the ancillary medical costs from the insurance network by engaging in ancillary medical procedures that are detrimental to receiving the predetermined reimbursement amount for the ancillary medical costs, and a modifier responsive to the identifier for modifying ancillary medical costs management behavior of the at least one of the plurality of physicians at the greater risk regarding the ancillary medical costs, the managing means further determining responsive to the modifier that the risk of not receiving the predetermined reimbursement amount for the ancillary medical costs from the insurance network has been reduced.

38. The healthcare management optimization system as defined in claim 37, wherein the analyzer further includes calculating means for calculating an average ancillary medical cost per physician for the healthcare practice and identifying the at least one physician that has ancillary medical costs that are a predetermined percentage greater than the average ancillary medical costs per physician for the healthcare practice.

39. The healthcare management optimization system as defined in claim 38, wherein the program product further comprises an educator responsive to the analyzer for educating the at least one physician on benefits of alternative ancillary medical procedures using research literature for comparing the alternative ancillary medical procedures to current ancillary medical procedures; and wherein the system further includes continued medical education classes to educate each of the plurality of physicians in the healthcare practice on the benefits of the alternative ancillary medical procedures.

40. The healthcare management optimization system as defined in claim 39, further comprising custom medical procedure forms provided to each of the plurality of physicians in the healthcare practice participating in the insurance network that include the ancillary medical procedures that are preferred by the insurance network to thereby define custom ancillary medical procedure forms.

41. The healthcare management optimization system as defined in claim 40, wherein the managing means further comprises patient intervening means for identifying at least one patient whose present ancillary medical procedures are not preferred by the insurance network and amending the at least one patient's present ancillary medical procedures.

42. The healthcare management optimization system as defined in claim 41, wherein the [management] *managing* means further comprises generating means for generating first and second letters, the first letter informing the ancillary medical facility that the at least one patient's ancillary medical procedures are amended to new ancillary medical procedures and the second letter informing the at least one patient that the patient's present ancillary medical procedures are amended to the new ancillary medical procedures, wherein the first and second letters are reviewed for accuracy, signed by the physician, and transmitted to the respective ancillary medical facility and the at least one patient.

43. The healthcare management optimization system as defined in claim 42, wherein the [management] *managing* means further comprises an updater for updating each of the plurality of physicians in the healthcare practice of any changes in the management of ancillary medical costs that are preferred by the insurance network.

44. The healthcare management optimization system as defined in claim 43, wherein the ancillary medical costs include any costs taken from the group of pharmacy, anesthesiology, blood, blood storage procedure and administration, radiology, electroencephalogram, electrocardiogram, emergency room, intravenous therapy, organ and tissue acquisition, labor and delivery, medical/surgical supplies, nuclear medicine, occupational therapy, operating room, physical therapy, recovery room, renal dialysis, respiratory therapy, special care, speech therapy, or therapeutic radiology.

45. A healthcare management optimization system for a healthcare practice including a plurality of physicians participating in an insurance network comprising:

a server having at least one database, the at least one database comprising a first and second database, the first database including the ancillary medical procedures that are more preferred by the insurance network, the second database including ancillary medical costs of each of the plurality of physicians participating in the insurance network;

a communications network positioned to be in communication with the server;

a plurality of computers positioned to be in communication with the communications network, each including a user interface responsive to a user;

computer executable program product stored on a tangible computer medium positioned on the server, comprising:

an updater responsive to the user interface updating each of the plurality of physicians in the healthcare practice of any changes in the management of medical costs other than those attributed directly to a medical procedure performed directly by any of the plurality of physicians to thereby define ancillary medical costs and that are preferred by the insurance network, recommending means responsive to the user interface for recommending to each of the plurality of physicians alternative medical procedures other than those performed directly by any of the plurality of physicians to thereby define ancillary medical procedures and that are preferred by the insurance network, an analyzer in communication with the first and second databases for analyzing the data in the first and second databases and comparing the ancillary medical procedures that are preferred by the insurance network with the ancillary medical costs of the plurality of physicians participating in the insurance network to thereby identify the ancillary medical costs of the physicians that are not preferred by the insurance network, and managing means responsive to the analyzer for managing the ancillary medical costs of the healthcare practice identified as not being preferred by the insurance network to thereby modify the ancillary medical costs of the physicians in the healthcare practice to be more profitable to the insurance network, the managing means including an identifier for identifying responsive to the analyzer at least one of the plurality of physicians in the healthcare practice participating in the insurance network that is at a greater risk of not receiving a predetermined reimbursement amount for the ancillary medical costs from the insurance network by engaging in ancillary medical procedures that are detrimental to receiving the predetermined reimbursement amount for the ancillary medical costs, and a modifier responsive to the identifier for modifying ancillary medical costs management behavior of the at least one of the plurality of physicians at the greater risk regarding the ancillary medical costs, the managing means further determining responsive to the modifier that the risk of not receiving the predetermined reimbursement amount for the ancillary medical costs from the insurance network has been reduced.

46. The healthcare management optimization system as defined in claim 45, wherein the analyzer further includes calculating means for calculating an average ancillary medical cost per physician for the healthcare practice and identifying the at least one physician that has ancillary medical costs that are a predetermined percentage greater than the average ancillary medical costs per physician for the healthcare practice.

47. The healthcare management optimization system as defined in claim 46, wherein the program product further comprises an educator responsive to the analyzer for educating the at least one physician on benefits of alternative ancillary medical procedures using research literature for comparing the alternative ancillary medical procedures to current ancillary medical procedures; and wherein the system further includes continued medical education classes to educate each of the plurality of physicians in the healthcare practice on the benefits of the alternative ancillary medical procedures.

48. The healthcare management optimization system as defined in claim 47, further comprising custom medical procedure forms provided to each of the plurality of physicians in the healthcare practice participating in the insurance network that include the ancillary medical procedures that are preferred by the insurance network to thereby define custom ancillary medical procedure forms.

49. The healthcare management optimization system as defined in claim 48, wherein the managing means further comprises patient intervening means for identifying at least one patient whose present ancillary medical procedures are not preferred by the insurance network and amending the at least one patient's present ancillary medical procedures.

50. The healthcare management optimization system as defined in claim 49, wherein the management means further comprises generating means for generating first and second letters, the first letter informing a medical facility other than that attributed directly to each of the plurality of physicians to thereby define an ancillary medical facility that the at least one patient's ancillary medical procedures are amended to new ancillary medical procedure and the second letter informing the at least one patient that the patient's present ancillary medical procedures are amended to the new ancillary medical procedures, wherein the first and second letters are reviewed for accuracy, signed by the physician, and transmitted to the respective ancillary medical facility and the at least one patient.

51. The healthcare management optimization system as defined in claim 50, wherein the ancillary medical costs include any costs taken from the group of pharmacy, anesthesiology, blood, blood storage procedure and administration, radiology, electroencephalogram, electrocardiogram, emergency room, intravenous therapy, organ and tissue acquisition, labor and delivery, medical/surgical supplies, nuclear medicine, occupational therapy, operating room, physical therapy, recovery room, renal dialysis, respiratory therapy, special care, speech therapy, or therapeutic radiology.

*52. A computer-assisted method of managing a healthcare practice participating in an insurance network to enhance profitability of the healthcare practice with respect to a predetermined reimbursement amount for ancillary pharmacy costs, the method comprising the steps of:*

*providing a first computer associated with a tangible non-transitory computer readable medium and positioned to receive data indicating pharmacy costs other than those attributed to a medical procedure performed directly by any of the plurality of physicians when the respective physician directly administers a medication to a patient to thereby define ancillary pharmacy costs attributed to the plurality of physicians;*

*receiving by the first computer from a second computer, the data indicating the ancillary pharmacy costs attributed to the plurality of physicians;*

*processing, by the first computer, the received data to include comparing the ancillary pharmacy costs attributed to the plurality of physicians with costs of ancillary prescription medications preferred by the insurance network to thereby identify physicians prescribing medications not preferred by the insurance network;*

*responsive to the step of processing, identifying by the first computer at least one of the plurality of physicians in the healthcare practice participating in the insurance network that is at a greater risk of not receiving the predetermined reimbursement amount for the ancillary pharmacy costs from the insurance network as a result of prescribing ancillary medications that are detrimental to receiving the predetermined reimbursement amount for the ancillary pharmacy costs;*

*responsive to the step of identifying at least one of the plurality of physicians at a greater risk of not receiving a predetermined reimbursement amount for the ancillary pharmacy costs, generating by the first computer information identifying alternative recommended prescription medications that are preferred by the insurance network to provide to the at least one of the plurality of physicians at a greater risk of not receiving a predetermined reimbursement amount for the ancillary pharmacy costs to thereby modify ancillary pharmacy costs management behavior of the at least one of the plurality of physicians at a greater risk of not receiving a predetermined reimbursement amount for the ancillary pharmacy costs; and*

*determining by the first computer that the risk of not receiving the predetermined reimbursement amount for ancillary pharmacy costs from the insurance network has been reduced responsive to an indication of a modification of ancillary pharmacy costs management behavior of the at least one of the plurality of physicians at a greater risk of not receiving the predetermined reimbursement amount for the ancillary pharmacy costs.*

*53. A computer-assisted method of managing a healthcare practice participating in an insurance network to enhance profitability of the healthcare practice with respect to a predetermined reimbursement amount for medical costs other than those attributed directly to a medical procedure performed by a physician to thereby define ancillary medical costs, the method comprising the steps of:*

*providing a first computer associated with a tangible non-transitory computer readable medium and positioned to receive data indicating medical costs attributed to the plurality of physicians in the healthcare practice participating in the insurance network other than those attributed directly to medical procedures performed by a physician to thereby define ancillary medical costs;*

*receiving by the first computer from at least one other computer, the data indicating the ancillary medical costs attributed to the plurality of physicians;*

*processing by the first computer, the received data to include comparing the ancillary medical costs attributed to the plurality of physicians with ancillary medical costs of ancillary medical procedures preferred by the insurance network to thereby identify physicians performing ancillary medical procedures not preferred by the insurance network;*

*responsive to the step of processing, identifying by the first computer at least one of the plurality of physicians in the healthcare practice participating in the insurance network that is at a greater risk of not receiving the predetermined reimbursement amount for the ancillary medical costs from the insurance network as a result of engaging in ancillary medical procedures that are detrimental to receiving the predetermined reimbursement amount for the ancillary medical costs;*

*responsive to the step of identifying at least one of the plurality of physicians at a greater risk of not receiving the predetermined reimbursement amount for the ancillary medical costs from the insurance network, generating by the first computer information identifying recommended alternative ancillary medical procedures that are preferred by the insurance network to provide to the at least one of the plurality of physicians at a greater risk of not receiving the predetermined reimbursement*

*amount for the ancillary medical costs to thereby modify management behavior of the at least one of the plurality of physicians at a greater risk of not receiving a predetermined reimbursement amount for the ancillary medical costs; and*

*determining by the first computer that the risk of not receiving the predetermined reimbursement amount for ancillary medical costs from the insurance network has been reduced to increase the profitability of the healthcare practice responsive to an indication of a modification of ancillary medical costs management behavior of the at least one of the plurality of physicians at a greater risk of not receiving the predetermined reimbursement amount for the ancillary medical costs.*

*54. A computer-assisted method of enhancing profitability of an insurance network having a plurality of physicians in a healthcare practice participating therein by managing ancillary medical costs, the method comprising the steps of:*

*providing a first computer associated with a tangible non-transitory computer readable medium and positioned to receive data indicating medical costs attributed to the plurality of physicians in the healthcare practice participating in the insurance network other than those attributed directly to medical procedures performed by any of the plurality of physicians to thereby define ancillary medical costs;*

*receiving by the first computer from a second computer, the data indicating the ancillary medical costs attributed to the plurality of physicians;*

*processing by the first computer, the received data to include comparing the ancillary medical costs attributed to the plurality of physicians with ancillary medical costs of ancillary medical procedures preferred by the insurance network to thereby identify physicians performing ancillary medical procedures not preferred by the insurance network;*

*responsive to the step of processing, identifying by the first computer at least one of the plurality of physicians in the healthcare practice participating in the insurance network that is at risk of not receiving a predetermined reimbursement amount for the ancillary medical costs from the insurance network as a result of performing ancillary medical procedures that are detrimental to receiving the predetermined reimbursement amount for the ancillary medical costs;*

*responsive to the step of identifying at least one of the plurality of physicians at risk of not receiving a predetermined reimbursement amount for the ancillary medical costs from the insurance network, generating by the first computer information identifying recommended alternative ancillary medical procedures that are preferred by the insurance network to provide to the at least one of the plurality of physicians at risk of not receiving a predetermined reimbursement amount for the ancillary medical costs from the insurance network, to thereby modify management behavior of the at least one of the plurality of physicians in the healthcare practice regarding ancillary medical costs that are not profitable for the insurance network; and*

*determining by the first computer, an amount of a monetary financial incentive to be provided to the insurance network and the plurality of physicians in the healthcare practice participating in the insurance network responsive to an indication of a modification of management behavior of the at least one of the plurality of physicians in the healthcare practice regarding ancillary medical costs that are not profitable for the insurance network.*

*55. A method has defined in claim 54,*

*wherein the second computer comprises one or more of the following: an ancillary medical network database computer, a pharmacy computer, a healthcare practice computer, an insurance network computer, and one or more physician computers; and*

*wherein the method further comprises providing by the first computer to a third computer, the information identifying recommended alternative ancillary medical procedures that are preferred by the insurance network, the third computer comprising one or more of the following: a healthcare practice computer and one or more physician computers.*

*56. A healthcare management optimization system to manage a healthcare practice including a plurality of physicians participating in an insurance network, the system comprising computer executable program code stored on a tangible computer medium, executable by a computer to perform the following operations:*

*receiving data indicating pharmacy costs other than those attributed to a medical procedure performed directly by any of the plurality of physicians when the respective physician directly administers a medication to a patient to thereby define ancillary pharmacy costs attributed to the plurality of physicians;*

*processing the received data to include comparing the ancillary pharmacy costs attributed to the plurality of physicians with costs of ancillary prescription medications preferred by the insurance network to thereby identify physicians prescribing medications not preferred by the insurance network;*

*responsive to the operation of processing, identifying at least one of the plurality of physicians in the healthcare practice participating in the insurance network that is at a greater risk of not receiving the predetermined reimbursement amount for the ancillary pharmacy costs from the insurance network as a result of prescribing ancillary medications that are detrimental to receiving the predetermined reimbursement amount for the ancillary pharmacy costs;*

*responsive to the operation of identifying at least one of the plurality of physicians at a greater risk of not receiving a predetermined reimbursement amount for the ancillary pharmacy costs, generating information identifying alternative recommended prescription medications that are preferred by the insurance network to provide to the at least one of the plurality of physicians at the a greater risk of not receiving a predetermined reimbursement amount for the ancillary pharmacy costs to thereby modify ancillary pharmacy costs management behavior of the at least one of the plurality of physicians at a greater risk of not receiving a predetermined reimbursement amount for the ancillary pharmacy costs; and*

*determining that the risk of not receiving the predetermined reimbursement amount for ancillary pharmacy costs from the insurance network has been reduced responsive to an indication of a modification of ancillary pharmacy costs management behavior of the at least one of the plurality of physicians at the greater risk of not receiving the predetermined reimbursement amount for the ancillary pharmacy costs.*

*57. A healthcare management optimization system to manage a healthcare practice including a plurality of physicians participating in an insurance network, the system comprising computer executable program code stored on a tangible computer medium, executable by a computer to perform the following operations:*

*receiving data indicating medical costs attributed to the plurality of physicians in the healthcare practice participating in the insurance network other than those attributed directly to medical procedures performed by a physician to thereby define ancillary medical costs attributed to the plurality of physicians;*

*processing the received data to include comparing the ancillary medical costs attributed to the plurality of physicians with ancillary medical costs of ancillary medical procedures preferred by the insurance network to thereby identify physicians performing ancillary medical procedures not preferred by the insurance network;*

*responsive to the operation of processing, identifying at least one of the plurality of physicians in the healthcare practice participating in the insurance network that is at a greater risk of not receiving the predetermined reimbursement amount for the ancillary medical costs from the insurance network as a result of engaging in ancillary medical procedures that are detrimental to receiving the predetermined reimbursement amount for the ancillary medical costs;*

*responsive to the operation of identifying at least one of the plurality of physicians at greater risk of not receiving the predetermined reimbursement amount for the ancillary medical costs from the insurance network, generating information identifying recommended alternative ancillary medical procedures that are preferred by the insurance network to provide to the at least one of the plurality of physicians at a greater risk of not receiving the predetermined reimbursement amount for the ancillary medical costs to thereby modify management behavior of the at least one of the plurality of physicians at a greater risk of not receiving a predetermined reimbursement amount for the ancillary medical costs; and*

*determining that the risk of not receiving the predetermined reimbursement amount for ancillary medical costs from the insurance network has been reduced to increase the profitability of the healthcare practice responsive to an indication of a modification of ancillary medical costs management behavior of the at least one of the plurality of physicians at a greater risk of not receiving the predetermined reimbursement amount for the ancillary medical costs.*

*58. A healthcare management optimization system to manage a healthcare practice including a plurality of physicians participating in an insurance network, the system comprising computer executable program code stored on a tangible computer medium, executable by a computer to perform the following operations:*

*receiving data indicating medical costs attributed to the plurality of physicians in the healthcare practice participating in the insurance network other than those attributed directly to medical procedures performed by a physician to thereby define ancillary medical costs attributed to the plurality of physicians;*

*processing the received data to include comparing the ancillary medical costs attributed to the plurality of physicians with ancillary medical costs of ancillary medical procedures preferred by the insurance network to thereby identify physicians performing ancillary medical procedures not preferred by the insurance network;*

*responsive to the operation of processing, identifying at least one of the plurality of physicians in the healthcare practice participating in the insurance network that is at risk of not receiving a predetermined reimbursement amount for the ancillary medical costs from the insurance network as a result of performing ancillary medical procedures that are detrimental to receiving the predetermined reimbursement amount for the ancillary medical costs;*

*responsive to the operation of identifying at least one of the plurality of physicians at risk of not receiving a predetermined reimbursement amount for the ancillary medical costs from the insurance network, generating information identifying recommended alternative ancillary medical procedures that are preferred by the insurance network to provide to the at least one of the plurality of physicians at risk of not receiving a predetermined reimbursement amount for the ancillary medical costs from the insurance network, to thereby modify management behavior of the at least one of the plurality of physicians in the healthcare practice regarding ancillary medical costs that are not profitable for the insurance network; and*

*determining an amount of a monetary financial incentive to be provided to the insurance network and the plurality of physicians in the healthcare practice participating in the insurance network responsive to an indication of a modification of management behavior of the at least one of the plurality of physicians in the healthcare practice regarding ancillary medical costs that are not profitable for the insurance network.*

*59. A healthcare management optimization system for a healthcare practice including a plurality of physicians participating in an insurance network, the system comprising:*

*a first database comprising medical procedures other than those performed directly by any of the plurality of physicians to thereby define ancillary medical procedures that are preferred by the insurance network;*

*a second database comprising medical costs other than those attributed directly to medical procedures performed by any of the plurality of physicians to thereby define ancillary medical costs of each of the plurality of physicians participating in the insurance network; and*

*computer executable program code stored on a tangible computer medium and executable by a computer to manage the healthcare practice participating in the insurance network, the computer executable program code comprising:*

*an analyzer in communication with the first and the second databases for analyzing the data in the first and the second database and comparing the ancillary medical procedures that are preferred by the insurance network with the ancillary medical costs of the plurality of physicians participating in the insurance network to thereby identify ancillary medical costs of the physicians that are not preferred by the insurance network; and*

*managing program code responsive to the analyzer for managing the ancillary medical costs of the healthcare practice identified as not being preferred by the insurance network to thereby modify the ancillary medical costs of the physicians in the healthcare practice to be more profitable to the insurance network, the managing program code executable by the computer to perform the following operations:*

*responsive to the analysis of the data in the first and the second databases, identifying at least one of the plurality of physicians in the healthcare practice participating in the insurance network that is at a greater risk of not receiving a predetermined reimbursement amount for the ancillary medical costs from the insur-*

*ance network by engaging in ancillary medical procedures that are detrimental to receiving the predetermined reimbursement amount for the ancillary medical costs,*

*responsive to the identification of at least one of the plurality of physicians in the healthcare practice at a greater risk of not receiving a predetermined reimbursement amount for the ancillary medical costs from the insurance network, generating information identifying recommended alternative ancillary medical procedures that are preferred by the insurance network to provide to the at least one of the plurality of physicians at risk of not receiving a predetermined reimbursement amount for the ancillary medical costs from the insurance network, to thereby modify ancillary medical costs management behavior of the at least one of the plurality of physicians at the greater risk of not receiving the predetermined reimbursement amount for the ancillary medical costs, and*

*determining that the risk of not receiving the predetermined reimbursement amount for the ancillary medical costs from the insurance network has been reduced responsive to an indication of a modification of ancillary pharmacy costs management behavior of the at least one of the plurality of physicians at risk of not receiving a predetermined reimbursement amount for the ancillary medical costs.*

*60. A healthcare management optimization system for a healthcare practice including a plurality of physicians participating in an insurance network, the system comprising:*

*a first database comprising medical procedures other than those performed directly by any of the plurality of physicians to thereby define ancillary medical procedures that are preferred by the insurance network;*

*a second database comprising medical costs other than those attributed directly to medical procedures performed by any of the plurality of physicians to thereby define ancillary medical costs of each of the plurality of physicians participating in the insurance network; and*

*computer executable program code stored on a tangible computer medium and executable by a computer to manage the healthcare practice participating in the insurance network, the computer executable program code comprising:*

*an analyzer in communication with the first and the second databases for analyzing the data in the first and the second database and comparing the ancillary medical procedures that are preferred by the insurance network with the ancillary medical costs of the plurality of physicians participating in the insurance network to thereby identify ancillary medical costs of the physicians that are not preferred by the insurance network; and*

*managing program code responsive to the analyzer for managing the ancillary medical costs of the healthcare practice identified as not being preferred by the insurance network to thereby modify the ancillary medical costs of the physicians in the healthcare practice to be more profitable to the insurance network, the managing program code including:*

*an identifier for identifying responsive to the analyzer at least one of the plurality of physicians in the healthcare practice participating in the insurance network that is at a greater risk of not receiving a predetermined reimbursement amount for the ancillary medical costs from the insurance network by engaging in ancillary medical procedures that are detrimental to receiving the predetermined reimbursement amount for the ancillary medical costs,*

*a modifier responsive to the identifier for modifying ancillary medical costs management behavior of the at least one of the plurality of physicians at the greater risk regarding the ancillary medical costs, and*

*program code for determining responsive to the modifier that the risk of not receiving the predetermined reimbursement amount for the ancillary medical costs from the insurance network has been reduced.*

*61. A healthcare management optimization system for a healthcare practice including a plurality of physicians participating in an insurance network, the system comprising:*

*a server having at least one database, the at least one database comprising a first and a second database, the first database including the ancillary medical procedures that are more preferred by the insurance network, the second database including ancillary medical costs of each of the plurality of physicians participating in the insurance network;*

*a communications network positioned to be in communication with the server;*

*a plurality of computers positioned to be in communication with the communications network, each including a user interface responsive to a user; and*

*computer executable program code stored on a tangible computer medium positioned on the server and executable by the server to manage the healthcare practice participating in the insurance network, the computer executable program code comprising:*

*an updater to update through to the user interface each of the plurality of physicians in the healthcare practice of any changes in the management of medical costs other than those attributed directly to a medical procedure performed directly by any of the plurality of physicians to thereby define ancillary medical costs and that are preferred by the insurance network,*

*recommending program code for recommending to each of the plurality of physicians through the user interface, alternative medical procedures other than those performed directly by any of the plurality of physicians to thereby define ancillary medical procedures and that are preferred by the insurance network,*

*an analyzer in communication with the first and the second databases for analyzing the data in the first and the second databases and comparing the ancillary medical procedures that are preferred by the insurance network with the ancillary medical costs of the plurality of physicians participating in the insurance network to thereby identify the ancillary medical costs of the physicians that are not preferred by the insurance network, and*

*managing program code responsive to the analyzer for managing the ancillary medical costs of the healthcare practice identified as not being preferred by the insurance network to thereby modify the ancillary medical costs of the physicians in the healthcare practice to be more profitable to the insurance network, the managing program code executable by the server to perform the following operations:*

*responsive to the analysis of the data in the first and the second databases, identifying at least one of the plurality of physicians in the healthcare practice participating in the insurance network that is at a greater risk of not receiving a predetermined reim-*

*bursement amount for the ancillary medical costs from the insurance network by engaging in ancillary medical procedures that are detrimental to receiving the predetermined reimbursement amount for the ancillary medical costs,*

*responsive to identification of at least one of the plurality of physicians in the healthcare practice that is at a greater risk of not receiving a predetermined reimbursement amount for the ancillary medical costs from the insurance network, generating information identifying recommended alternative ancillary medical procedures that are preferred by the insurance network to provide to the at least one of the plurality of physicians at a greater risk of not receiving a predetermined reimbursement amount for the ancillary medical costs to thereby modify ancillary medical costs management behavior of the at least one of the plurality of physicians at the greater risk of not receiving the predetermined reimbursement amount for the ancillary medical costs, and*

*determining that the risk of not receiving the predetermined reimbursement amount for the ancillary medical costs from the insurance network has been reduced responsive to an indication of a modification of ancillary pharmacy costs management behavior of the at least one of the plurality of physicians at the greater risk of not receiving the predetermined reimbursement amount for the ancillary pharmacy costs.*

*62. A healthcare management optimization system for a healthcare practice including a plurality of physicians participating in an insurance network, the system comprising:*

*a server having at least one database, the at least one database comprising a first and a second database, the first database including the ancillary medical procedures that are more preferred by the insurance network, the second database including ancillary medical costs of each of the plurality of physicians participating in the insurance network;*

*a communications network positioned to be in communication with the server;*

*a plurality of computers positioned to be in communication with the communications network, each including a user interface responsive to a user; and*

*computer executable program code stored on a tangible computer medium positioned on the server and executable by the server to manage the healthcare practice participating in the insurance network, the computer executable program code comprising:*

*an updater to update through to the user interface each of the plurality of physicians in the healthcare practice of any changes in the management of medical costs other than those attributed directly to a medical procedure performed directly by any of the plurality of physicians to thereby define ancillary medical costs and that are preferred by the insurance network,*

*recommending program code for recommending to each of the plurality of physicians through the user interface, alternative medical procedures other than those performed directly by any of the plurality of physicians to thereby define ancillary medical procedures and that are preferred by the insurance network,*

*an analyzer in communication with the first and the second databases for analyzing the data in the first and the second databases and comparing the ancillary medical procedures that are preferred by the insurance network with the ancillary medical costs of the plurality of physicians participating in the insurance network to thereby identify the ancillary medical costs of the physicians that are not preferred by the insurance network, and*

*managing program code responsive to the analyzer for managing the ancillary medical costs of the healthcare practice identified as not being preferred by the insurance network to thereby modify the ancillary medical costs of the physicians in the healthcare practice to be more profitable to the insurance network, the managing program code including:*

*an identifier for identifying responsive to the analyzer at least one of the plurality of physicians in the healthcare practice participating in the insurance network that is at a greater risk of not receiving a predetermined reimbursement amount for the ancillary medical costs from the insurance network by engaging in ancillary medical procedures that are detrimental to receiving the predetermined reimbursement amount for the ancillary medical costs,*

*a modifier responsive to the identifier for modifying ancillary medical costs management behavior of the at least one of the plurality of physicians at the greater risk regarding the ancillary medical costs, and*

*program code for determining responsive to the modifier that the risk of not receiving the predetermined reimbursement amount for the ancillary medical costs from the insurance network has been reduced.*

* * * * *